US011258223B1

(12) United States Patent
Fujitake et al.

(10) Patent No.: US 11,258,223 B1
(45) Date of Patent: Feb. 22, 2022

(54) AUTOMATED FLEXIBLE STRAND FEEDER ASSEMBLY

(71) Applicant: Design Ready Controls, Inc., Brooklyn Park, MN (US)

(72) Inventors: Mark Ryan Fujitake, Brooklyn Park, MN (US); Christopher Mackedanz, Brooklyn Park, MN (US); Thomas J. Fitzenberger, Brooklyn Park, MN (US); Troy Schmidtke, Brooklyn Park, MN (US)

(73) Assignee: Design Ready Controls, Inc., Brooklyn Park, MN (US)

( * ) Notice: Subject to any disclaimer, the term of this patent is extended or adjusted under 35 U.S.C. 154(b) by 0 days.

(21) Appl. No.: 16/541,330

(22) Filed: Aug. 15, 2019

(51) Int. Cl.
*B23P 19/00* (2006.01)
*H01R 43/28* (2006.01)
*H01B 13/00* (2006.01)

(52) U.S. Cl.
CPC ......... *H01R 43/28* (2013.01); *H01B 13/0003* (2013.01); *Y10T 29/5313* (2015.01)

(58) Field of Classification Search
CPC . H01R 43/052; H01R 43/28; Y10T 29/53243; Y10T 24/3936; Y10T 29/5138; Y10T 29/53213; Y10T 29/5313
USPC ......... 29/729, 747, 748, 749, 751, 755, 759, 29/786, 850, 863
See application file for complete search history.

(56) References Cited

U.S. PATENT DOCUMENTS

| | | | |
|---|---|---|---|
| 4,062,095 A | 12/1977 | Storz | |
| 4,087,908 A | 5/1978 | Fusco et al. | |
| 4,607,430 A | 8/1986 | Young | |
| 4,653,159 A | 3/1987 | Henderson et al. | |
| 4,680,841 A | 7/1987 | Schneider et al. | |
| 5,305,508 A | 4/1994 | Koch et al. | |
| 5,477,607 A | 12/1995 | Ohta et al. | |
| 6,135,164 A | 10/2000 | Celoudoux et al. | |
| 9,132,985 B2 | 9/2015 | Wortmann et al. | |
| 9,327,405 B2 | 5/2016 | Shiota et al. | |
| 9,475,669 B2 | 10/2016 | Schütz et al. | |
| 10,112,252 B2 | 10/2018 | Romenesko et al. | |
| 10,155,278 B2 | 12/2018 | Matiash et al. | |
| 2002/0178580 A1 | 12/2002 | Conte | |
| 2017/0129709 A1 * | 5/2017 | Mazur | B65H 51/18 |

FOREIGN PATENT DOCUMENTS

| | | |
|---|---|---|
| EP | 0442037 B1 | 8/1993 |
| WO | 2018172803 A1 | 9/2018 |

* cited by examiner

*Primary Examiner* — Thiem D Phan
(74) *Attorney, Agent, or Firm* — Dietz Law Office LLC

(57) ABSTRACT

An automated wire feeder assembly to first repetitively receive a wire from a gripper of an automated processing tool and then load the wire into a hollow conduit coupled to the gripper of the automated tool. The wire feeder assembly includes belts that pivot between open and closed positions and each belt rotate to advance a wire into the conduit attached to the gripper of the automated tool. When the belts are in the open position the gripper of the automated tool places a free end of the wire into a wire guide. Pivoting the belts to the closed position engages the belts with the free end of the wire. Once the belt is engaged with the free end of the wire, rotating the belts advances the wire out of the wire feeder and into the gripper conduit.

20 Claims, 30 Drawing Sheets

AUTOMATED FLEXIBLE STRAND FEEDER ASSEMBLY

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to a wire feeder or filament feeder suitable for loading pre-cut wires or filaments into automated processing equipment or tools. The invention includes a wire feeder having belts that pivot open to allow grippers of an automated tool to place an end of the pre-cut wire into the wire feeder and then pivot closed to engage the wire and load or feed the wire into the automated process tool. More particularly, the present invention further pertains to an automated wire feeder that may first be loaded with a wire, filament, or strand by an automated tool and then load that same wire into a sheath or conduit attached to the automated tool.

BACKGROUND

Over the years, various equipment and tools have been utilized to place wires and filaments during an automated process. By way of example, automated tools have been utilized to cut wires to desired lengths and then placed into a holding block. The wire are later removed from the block and placed on a template or pegboard to make a wire harness. Generally, these wiring harnesses or bundled wires have been incorporated into many tools, equipment, and machinery. Typically, the specifications or criteria for each wire in the harness or bundle is identified before the wires are cut. Once the wire harness design is established, each wire is cut to a length that exceeds the desired length and then the wires are placed and bundled together to form a wire harness. Wiring designs have been improved by analyzing and creating bundles of wires having optimal routing and organization of the wires within the tool, equipment, or machine to form an ideal wire harness. Although designing a wire harness has been automated, it is common to place the wires on a wire harness peg board by hand to assemble the wire harness. Also, the assembly of the wire harness requires individual placement of wires on the peg board.

Manual assembly of wire harnesses increases potential for inconsistent routing of wires and inconsistent start/termination positions of each wire. The shortcomings of manual assembly may be overcome with the use of automated tools and equipment such as robotic aids. In the past when robotic aids have been used the wires have been dragged over the peg board to avoid entanglement with the robotic articulating arm. However, picking and placing wires with an articulable arm of a processing tool and dragging the wires across the board may lead to tangled or damaged wires of the wire harness. The present invention loads a precut wire into a coiled sheath or conduit attached to the articulating arm to avoid entanglement with the arm. Further, the preloaded automated tool dispenses the wire on the pegboard in a manner that avoids entanglement of multiple wires on the board.

SUMMARY

Embodiments according to aspects of the invention includes a wire feeder assembly capable of being loaded with a precut wire by an automated processing tool and which then loads that same wire back into a conduit or reservoir of the automated processing tool. Further, a gripper of the automated tool is used to load the wire from the top of the wire feeder and then the gripper is positioned at an end or outlet of the wire feeder to receive the wire into the conduit attached to the gripper of the automated processing tool. Additionally, the wire feeder assembly advances the wire without pinching, denting, or creating gear teeth tracks or marks on the wire sheathing.

In an exemplary embodiment of the invention the wire feeder assembly includes a wire feeder, a guide, a drive motor, and an actuator. The wire feeder generally includes belts that rotate to advance a wire. The belts of the wire feeder also pivot to an open position for loading a wire into the wire feeder. A first wire guide is positioned adjacent the belts and is aligned with a longitudinal axis of the rotatable and pivotable belts. The drive motor has a shaft coupled to the wire feeder such that when the drive motor shaft is rotated the wire feeder belts rotate. Further, the actuator is coupled to the wire feeder in a manner so that when the actuator is activated the belts pivot open or closed.

The embodiment of the invention may further include opposing belts that rotate in opposite directions. For example, when looking down on the feeder when a first belt rotates in a counterclockwise direction, the opposing second belt rotates in a clockwise direction. In this manner, when a wire is positioned between the belts and engaged by the belts, the wire is advanced through the wire feeder. The opposing belts pivot open to allow the gripper of an automated tool to load an end of a wire into the wire guide and between the belts. The belts are pivoted closed to engage the wire. Various gauge wires may be positioned between the belts and advanced by the belts of the wire feeder without damaging the sheathing of the wire.

A controller is electrically coupled to the drive motor and actuator. The controller independently controls the activation or starting and stopping of the drive motor and actuator. The controller may further independently control the speed and direction (forward or reverse) of the drive motor and actuator. In this manner, the controller may indirectly control the speed and direction that the wire feeder belts rotate and may further control the pivoting of the belts between an open and closed position.

The first wire guide may be further aligned at an inlet of the wire feeder to facilitate the loading of wire into the wire feeder. A second wire guide may be aligned with the longitudinal axis of the rotatable and pivotable belts and may also be aligned at an outlet of the wire feeder. The second wire guide provides stability to the wire as it advances out of the wire guide. Additionally, the second wire guide may be spaced apart from the wire feeder a sufficient distance to allow a first grip of the gripper of the automated tool to be positioned between the second wire guide and the wire feeder.

Each belt of the wire feeder may encompass an idler shaft and rotating shaft. Further, each belt may encompass a pivot clevis that is aligned for receiving a corresponding belt drive shaft. Similarly a tension clevis may be encompassed by the belt and aligned for receiving an idler shaft. An adjustable span interconnects the tension clevis and pivot clevis. The adjustable span allows the user to adjust the distance between the tension clevis and pivot clevis pair, thereby adjusting the amount of tension translated to the belt. Further, the adjustable span allows for a canting of the tension clevis and pivot clevis to align the clevis pair in parallel. In this manner, the up or down position of the belt relative to the clevis pair may be adjusted. Belt drive gears are fixed to the belt drive shaft and a belt idle gear is rotatably coupled about the idler shaft. The belts engage the belt drive gear and belt idle gear. Rotation of the belt drive shaft causes each belt to rotate about the pivot clevis and tension clevis. Further, gearing interconnects the two belt drive shafts corresponding to the belts. Additionally, one of the belt drive shafts is interconnected with the shaft of the drive motor. In this manner, the rotation of the shaft of the drive motor is translated to the rotation of the belts. The actuator includes a gear that may engage and disengage with gearing that is fixed to the pivot clevises. When the actuator gear rotates the gearing rotates and thereby pivots the pivot clevises and corresponding belts. Thus, the actuator may rotate the actuator gears to thereby pivot the belts open and closed.

Another embodiment according to aspects of the invention includes a wire feeder for use with a robot to receive an end of a precut wire from the robot and then load that same wire into a conduit reservoir attached to the robot. The apparatus generally includes a wire feeder, a wire guide, a drive motor and an actuator or pivot motor. The wire feeder has opposing first and second belts that both rotate and pivot. The structure to support each belt includes a pivot clevis and tension clevis pair and an adjustable span. Each pivot clevis is coupled to a belt drive shaft via a bearing that allows the belt drive shaft to freely rotate within the pivot clevis and each tension clevis is coupled to a belt idler shaft via a bearing that allows the belt idler shaft to freely rotate within the tension clevis. The adjustable span of each pivot clevis and tension clevis pair allows a space between the tension clevis and pivot clevis to be adjusted. Each belt drive shaft includes a belt drive gear fixed to the shaft. Similarly, each belt idler shaft includes a belt idler gear coupled to the idler shaft in a manner to allow the idler gear to freely rotate about the idler shaft. Each belt encompasses a corresponding combination of pivot clevis and idler clevis pair containing the corresponding drive shaft and idler shaft and rotating about the belt drive gear and idler gear. A shaft of the drive motor is coupled to the belt drive shafts such that rotation of the drive motor shaft translates to a rotation of the corresponding belt. Gears couple the two belt drive shafts so that a rotation of one of the drive shafts cause the other drive shaft to rotate in an opposite direction. Thus the belts likewise rotate in opposing directions. Similarly, the actuator is coupled to the pivot clevises such that rotation by the actuator causes the two belts to pivot about corresponding first and second belt drive shafts in opposing directions.

The embodiment of the invention may further include a controller to independently control activation of the drive motor and actuator. By way of example, the control may control the actuator to pivot the belts of the wire feeder to an open position while also controlling the drive motor to rotate the belts in either a forward or reverse direction. The wire guide is aligned with a longitudinal axis of the belts. The belts are pivoted to an open position to facilitate the loading of a wire into the wire guide of the wire feeder. A second wire guide is aligned at an outlet of the wire feeder and is also aligned with the longitudinal axis of the rotatable and pivotable belts. The second wire guide is spaced apart from the wire feeder a sufficient distance to allow a first grip of the gripper of the automated tool to be positioned between the second wire guide and the wire feeder.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
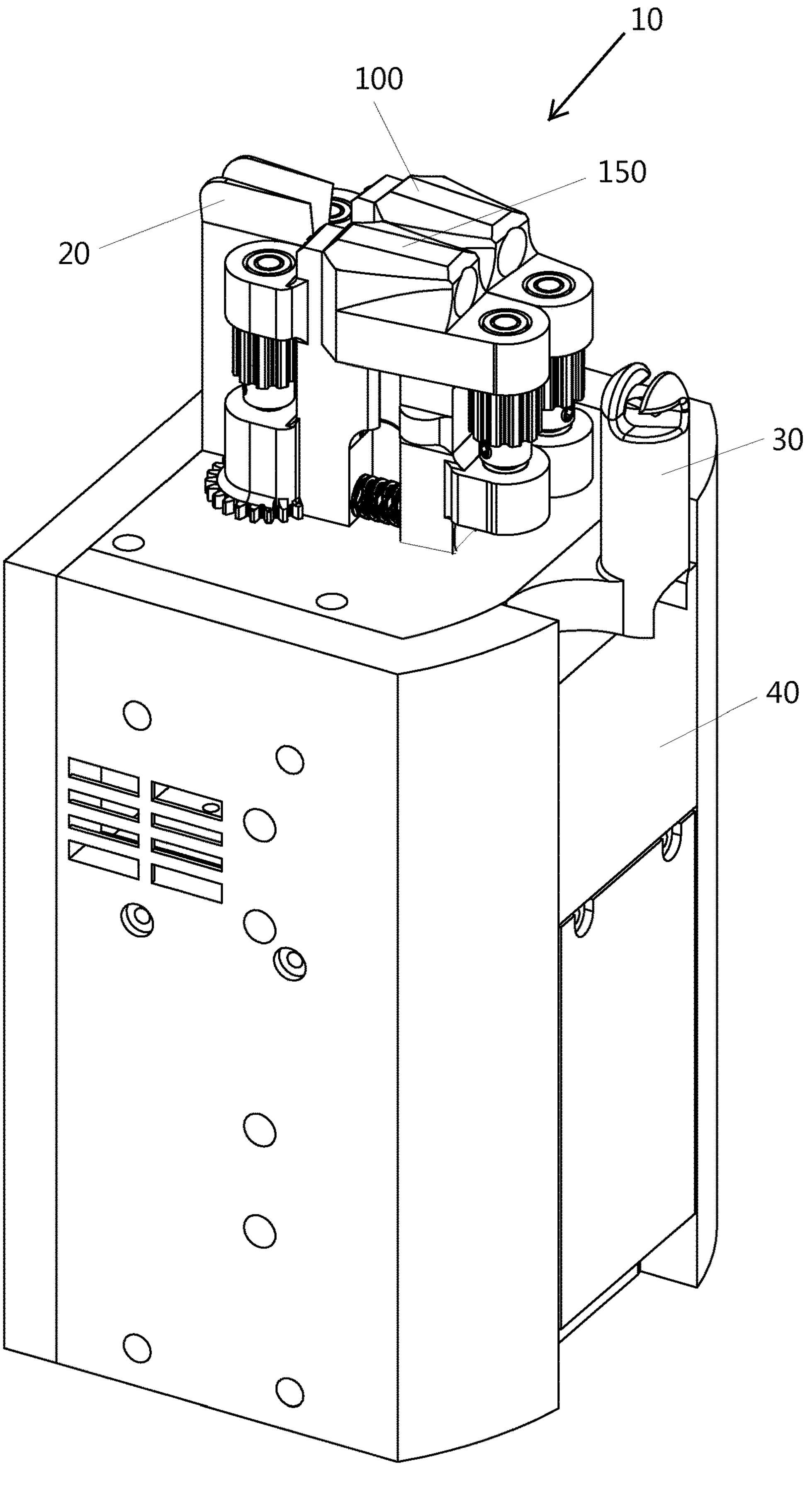
FIG. 1 is a front left perspective view of an embodiment of the strand feeder assembly of the present invention.
Figure 2:
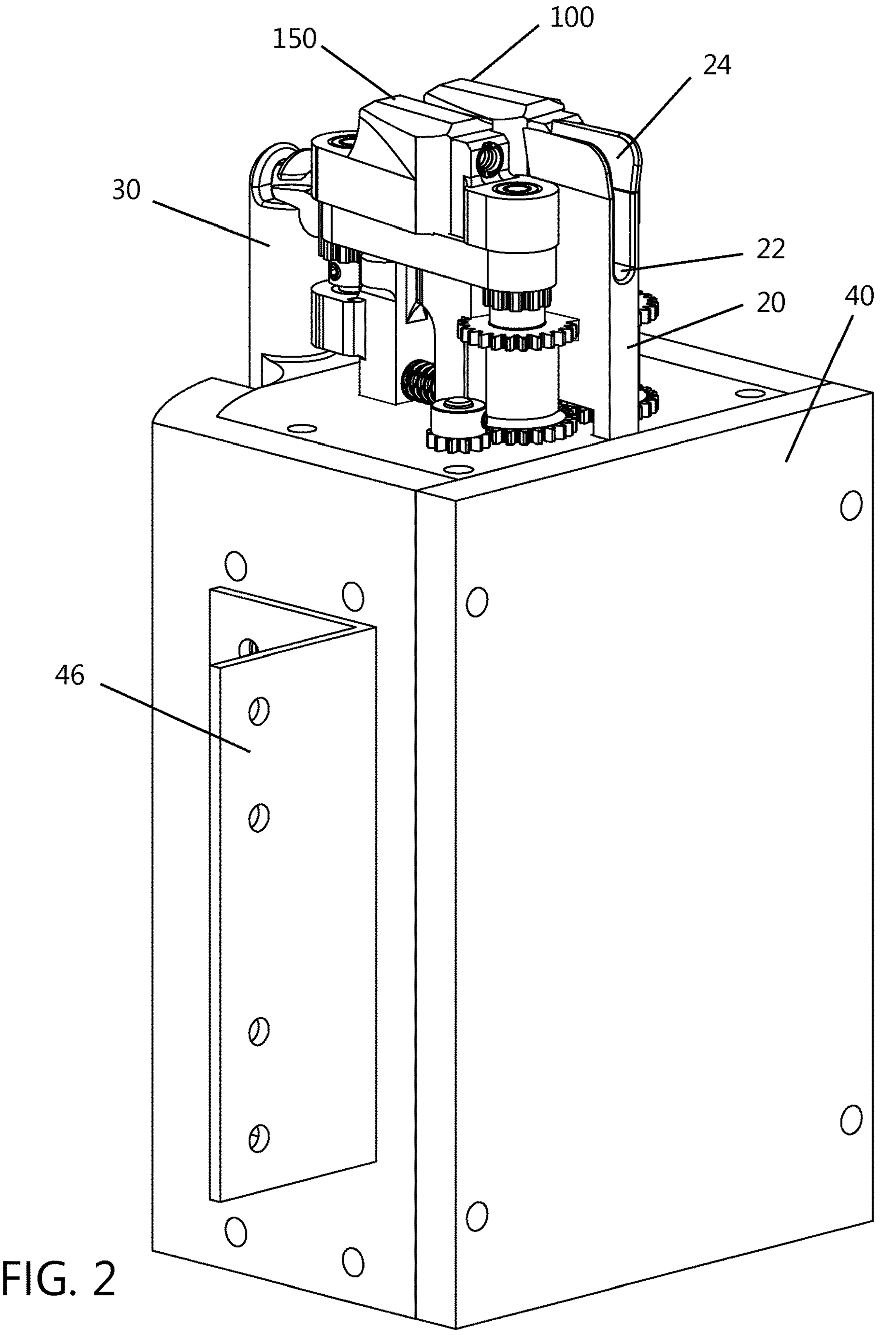
FIG. 2 is a back right perspective view of an embodiment of the strand feeder assembly of the present invention.
Figure 3:
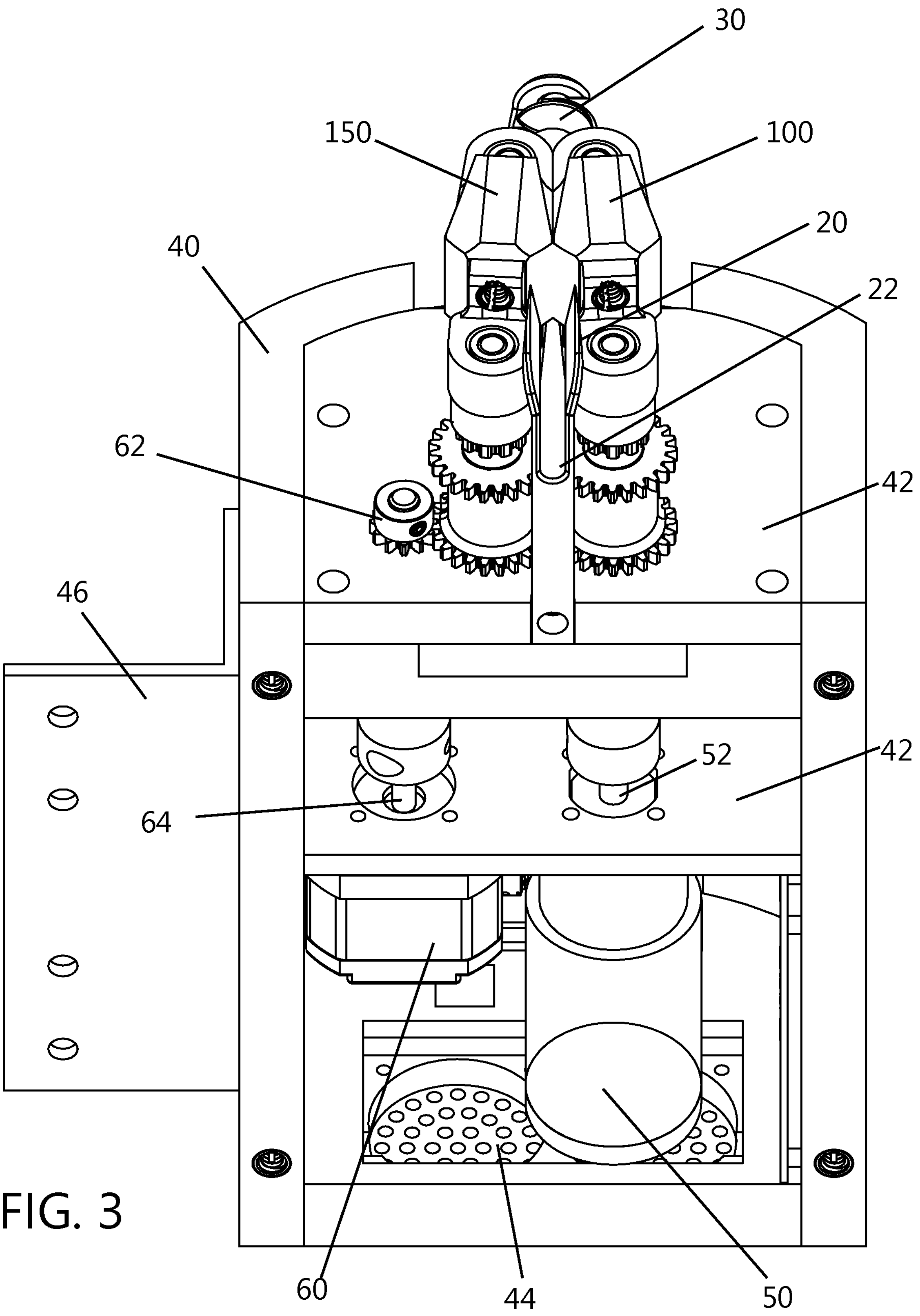
FIG. 3 is a partial sectional back perspective view of a wire feeder assembly of the present invention.
Figure 4:
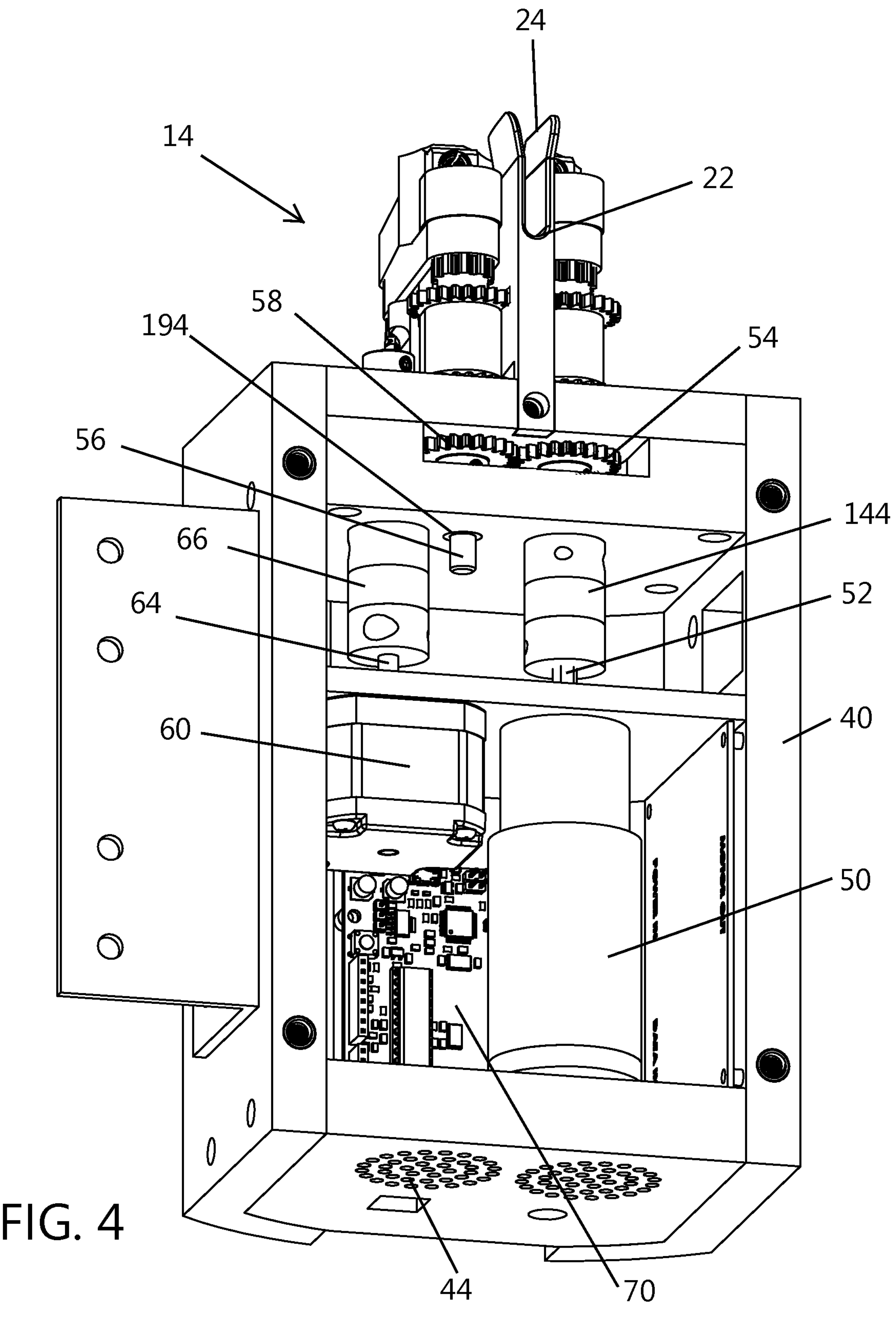
FIG. 4 is a partial sectional back perspective view of a wire feeder assembly of the present invention.
Figure 5:
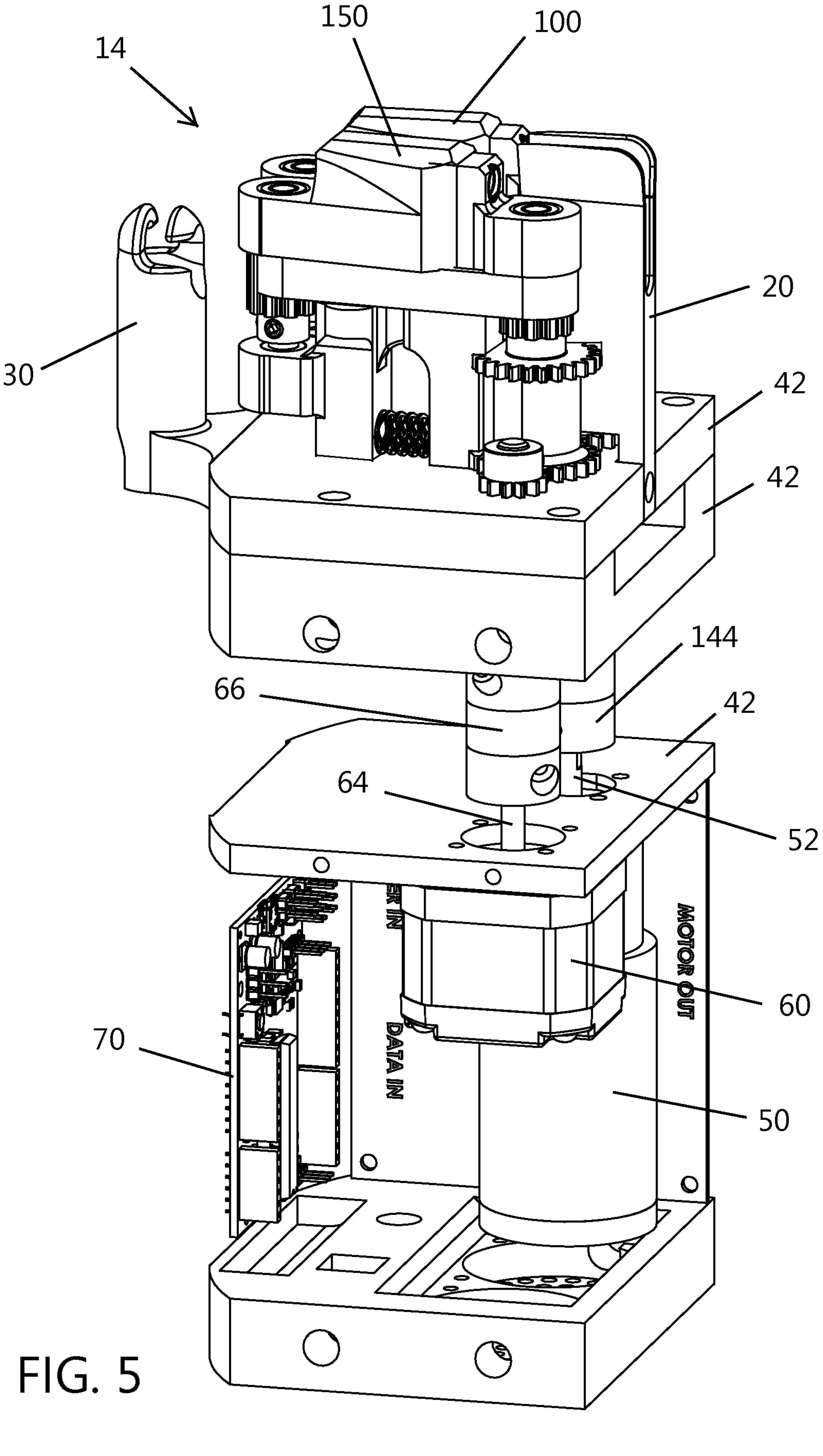
FIG. 5 is a partial sectional side perspective view of the wire feeder assembly of the type shown in FIG. 4.
Figure 6:
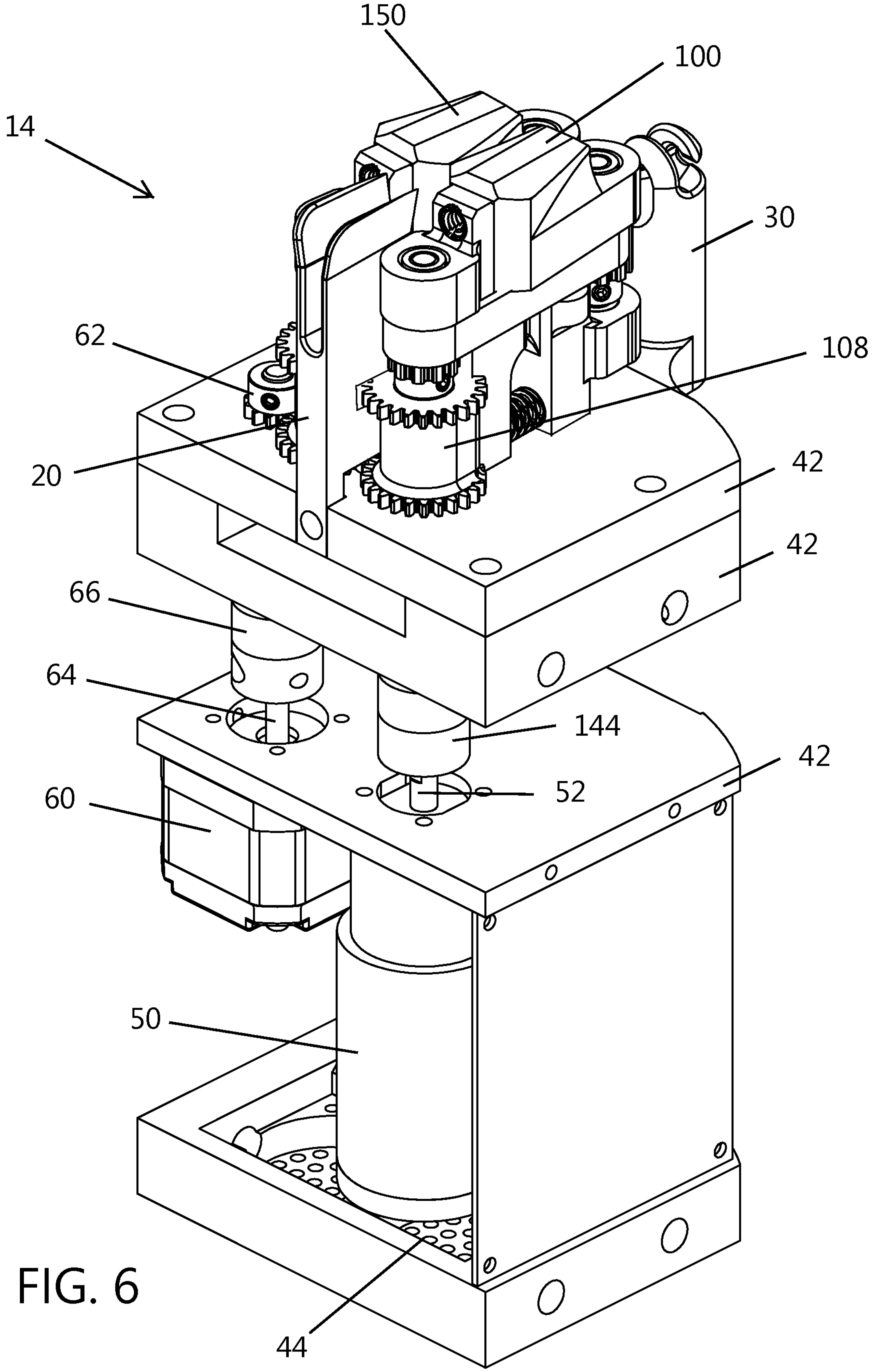
FIG. 6 is a partial sectional back left perspective view of the wire feeder assembly of the type shown in FIG. 4.
Figure 7:
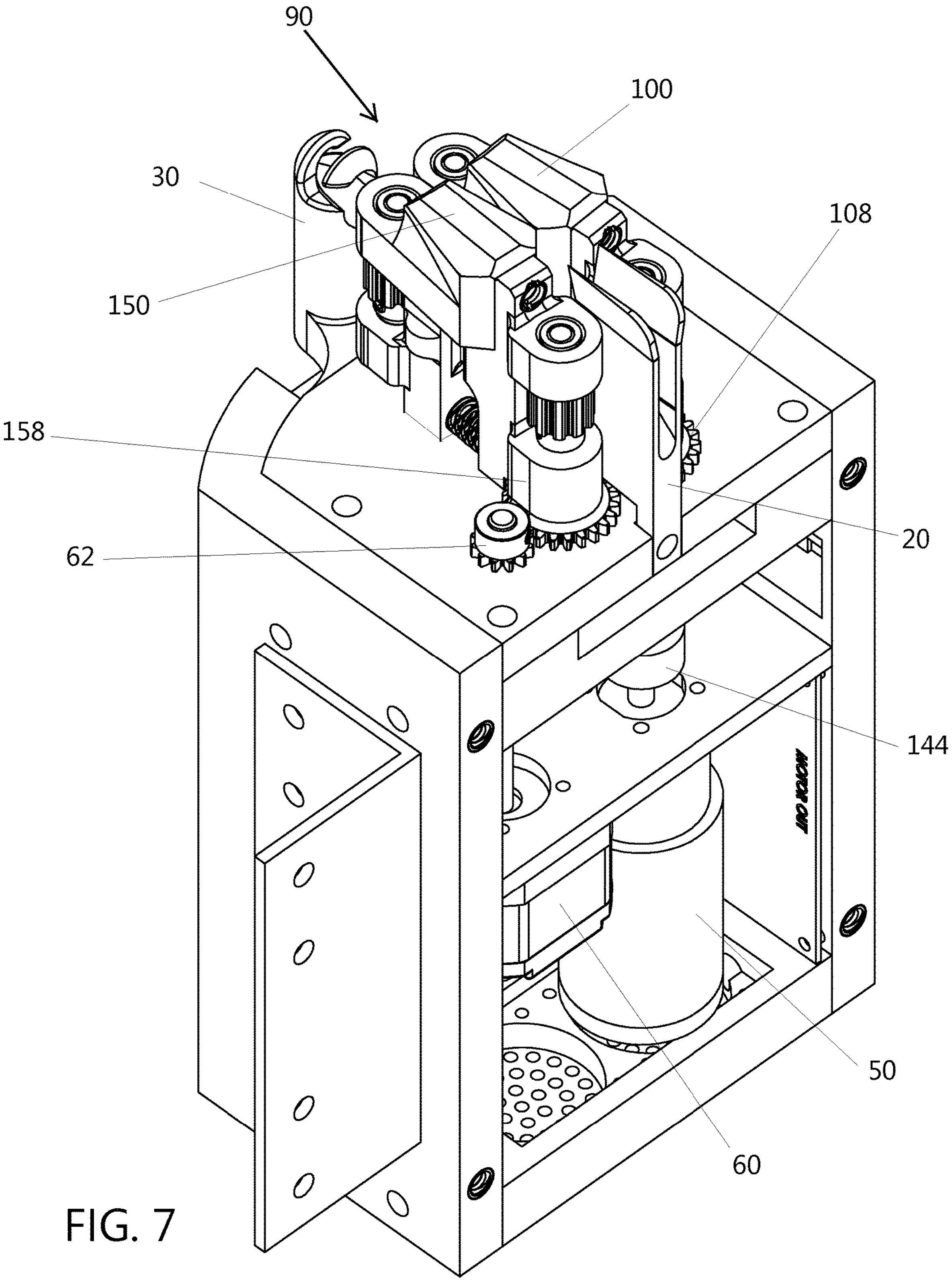
FIG. 7 is a partial section back perspective view of an embodiment of the wire feeder assembly of the present invention.
Figure 8:
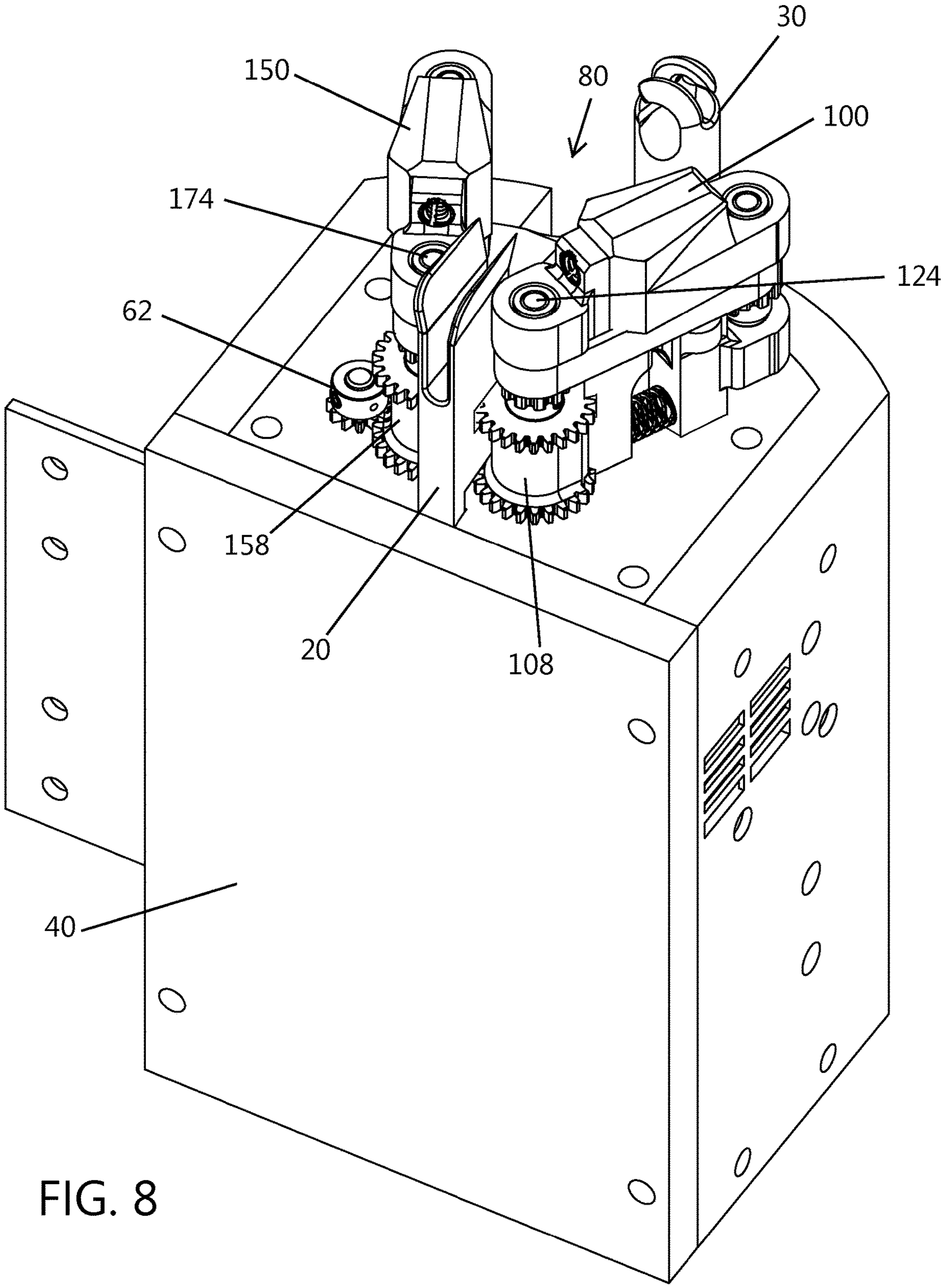
FIG. 8 is a back left perspective view of a strand feeder assembly of the present invention shown having the wire advancement assembly in an open position.
Figure 9:
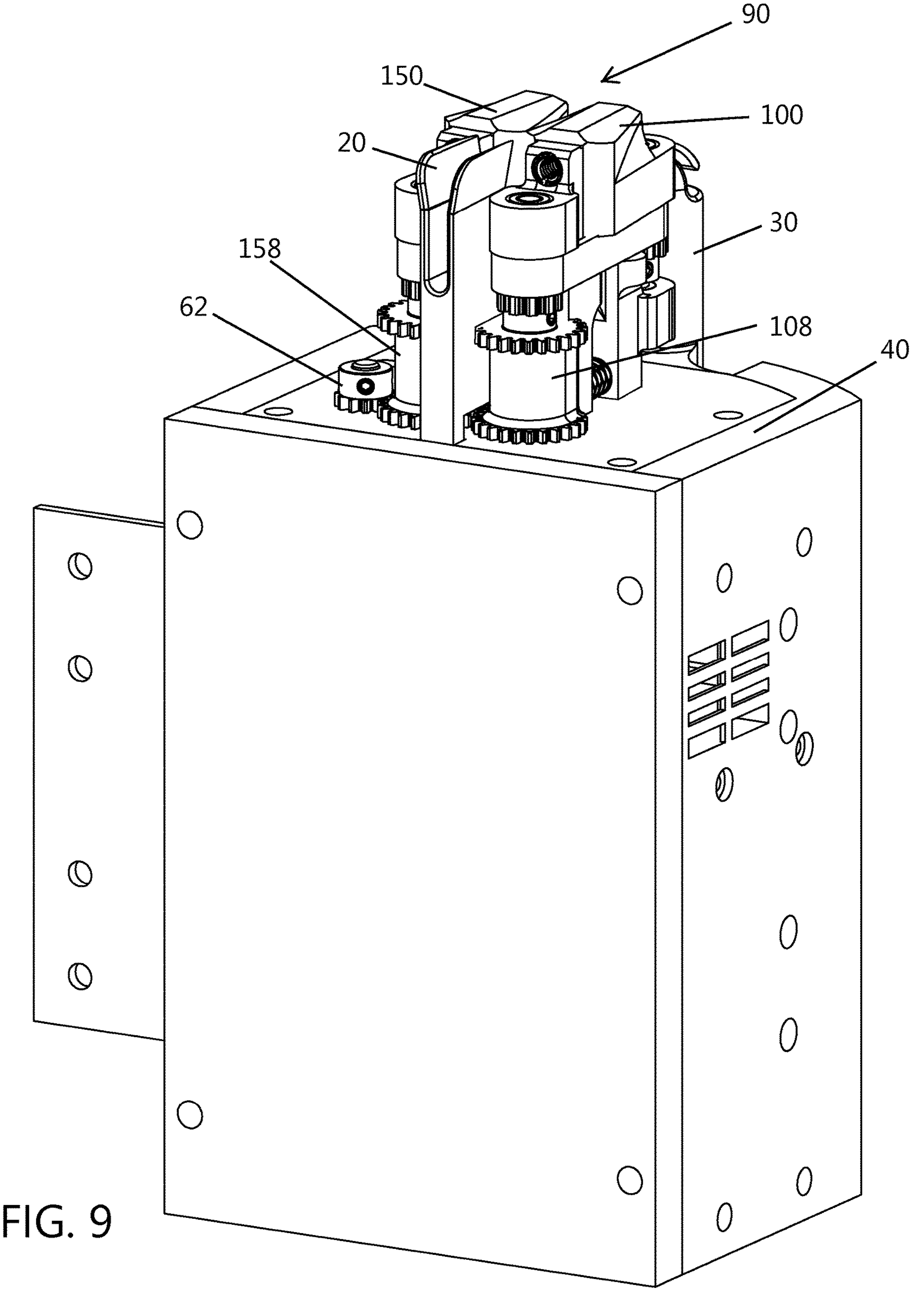
FIG. 9 is a back left perspective view of a strand feeder assembly of the type shown in FIG. 8 shown having the wire advancement assembly in a closed position.
Figure 10:
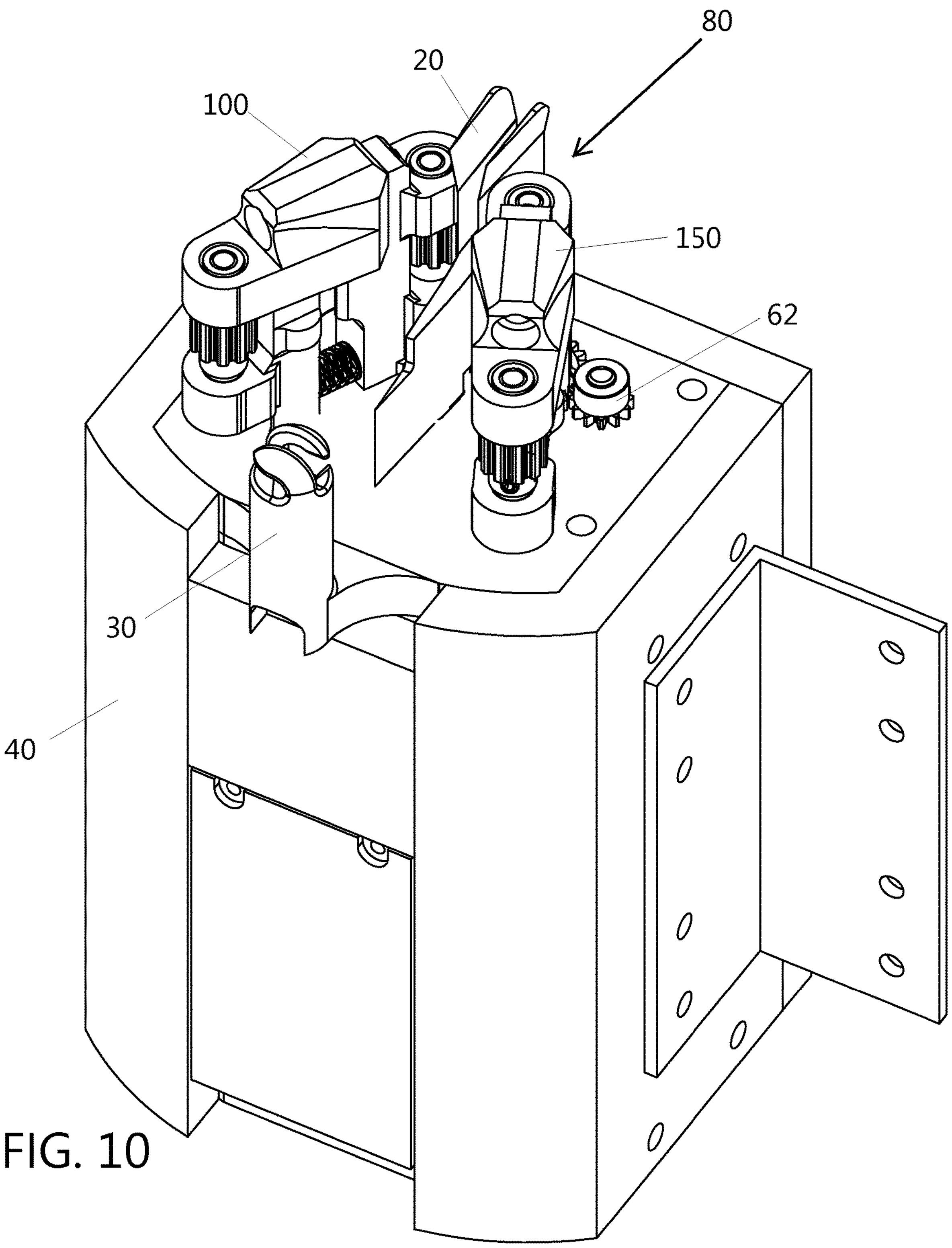
FIG. 10 is a front perspective view of a strand feeder assembly of the present invention shown in an open position.
Figure 11:
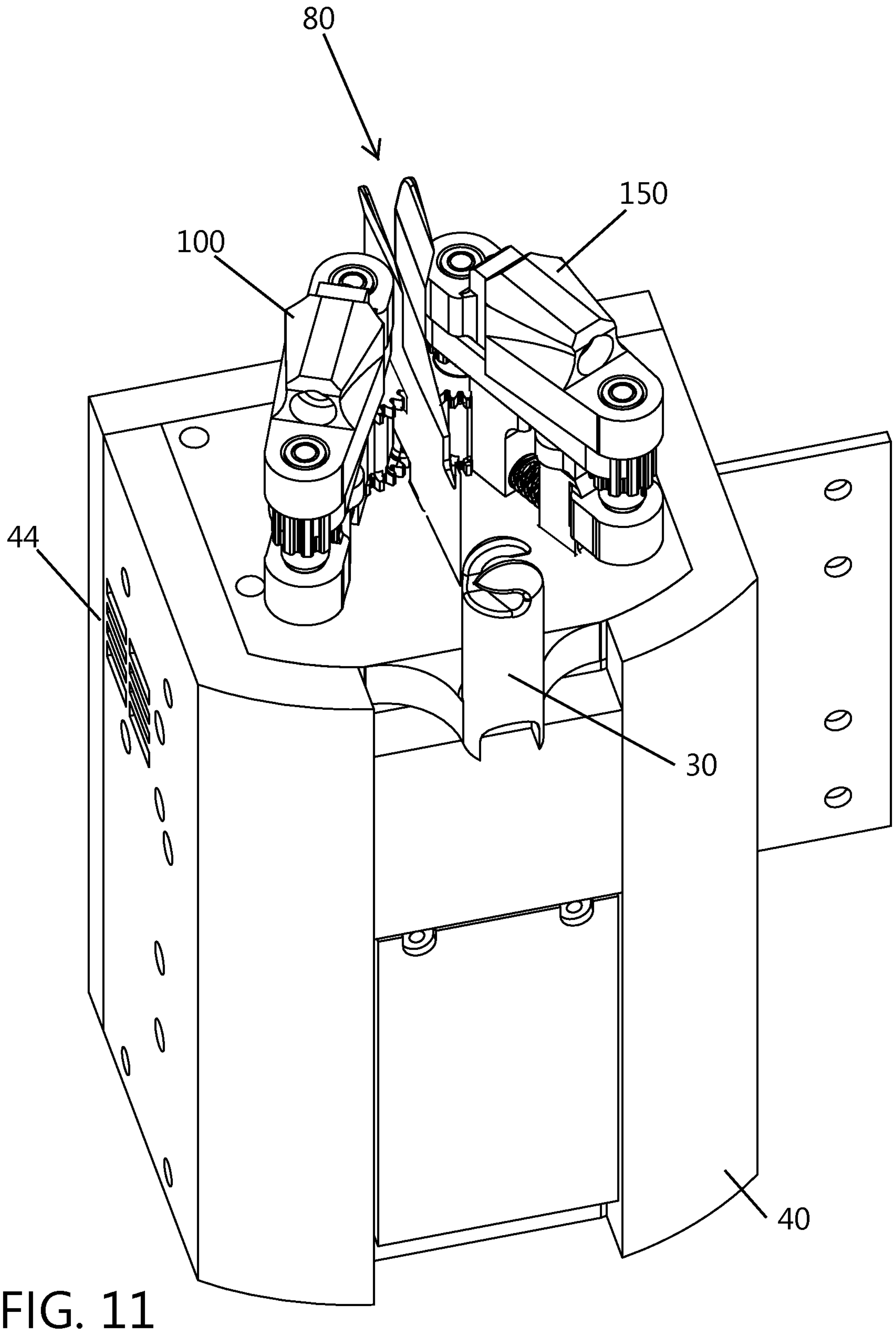
FIG. 11 is a front perspective view of a strand feeder assembly of the present invention shown in an open position.
Figure 12:
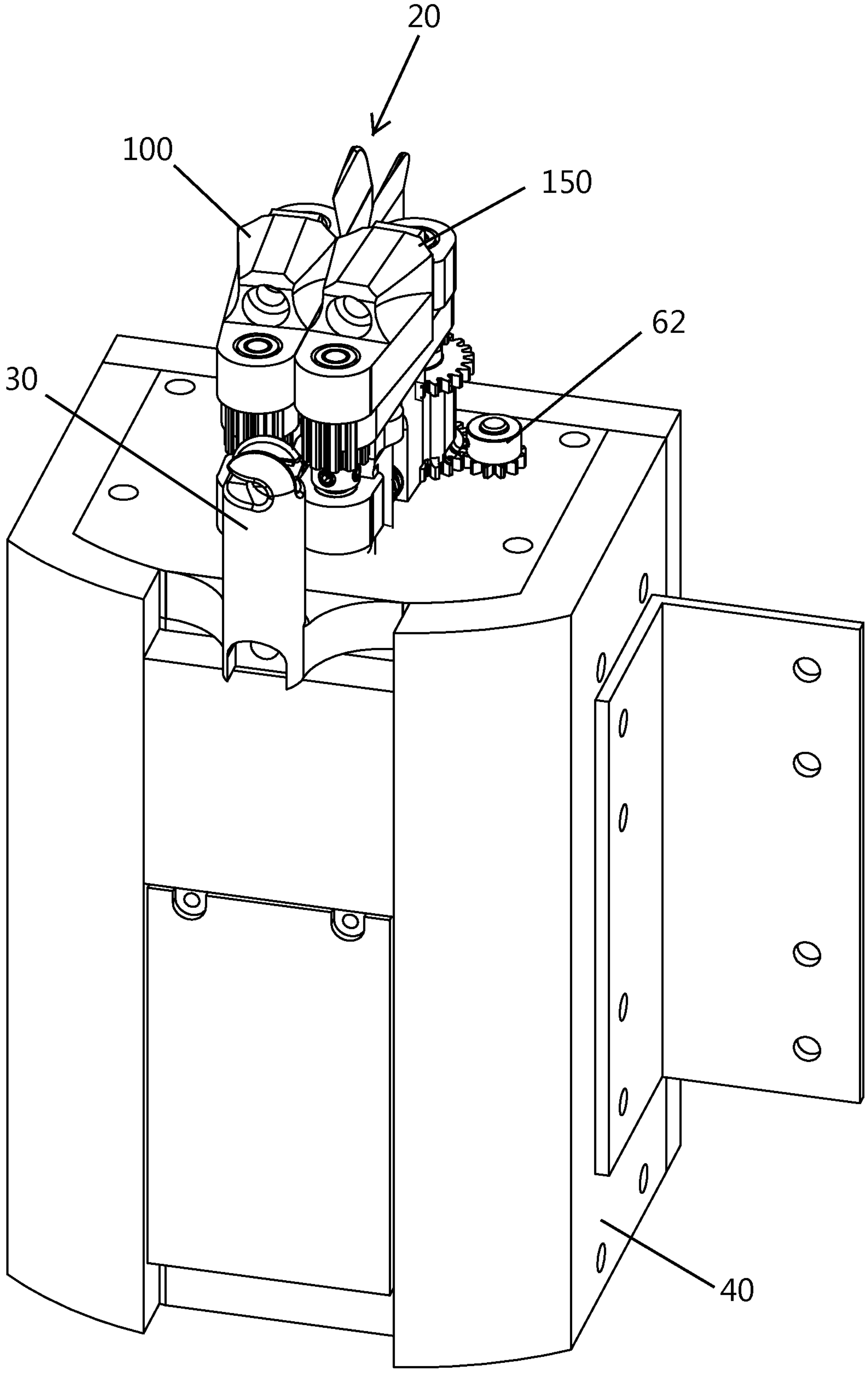
FIG. 12 is a front perspective view of a strand feeder assembly of the present invention shown in the closed position.
Figure 13:
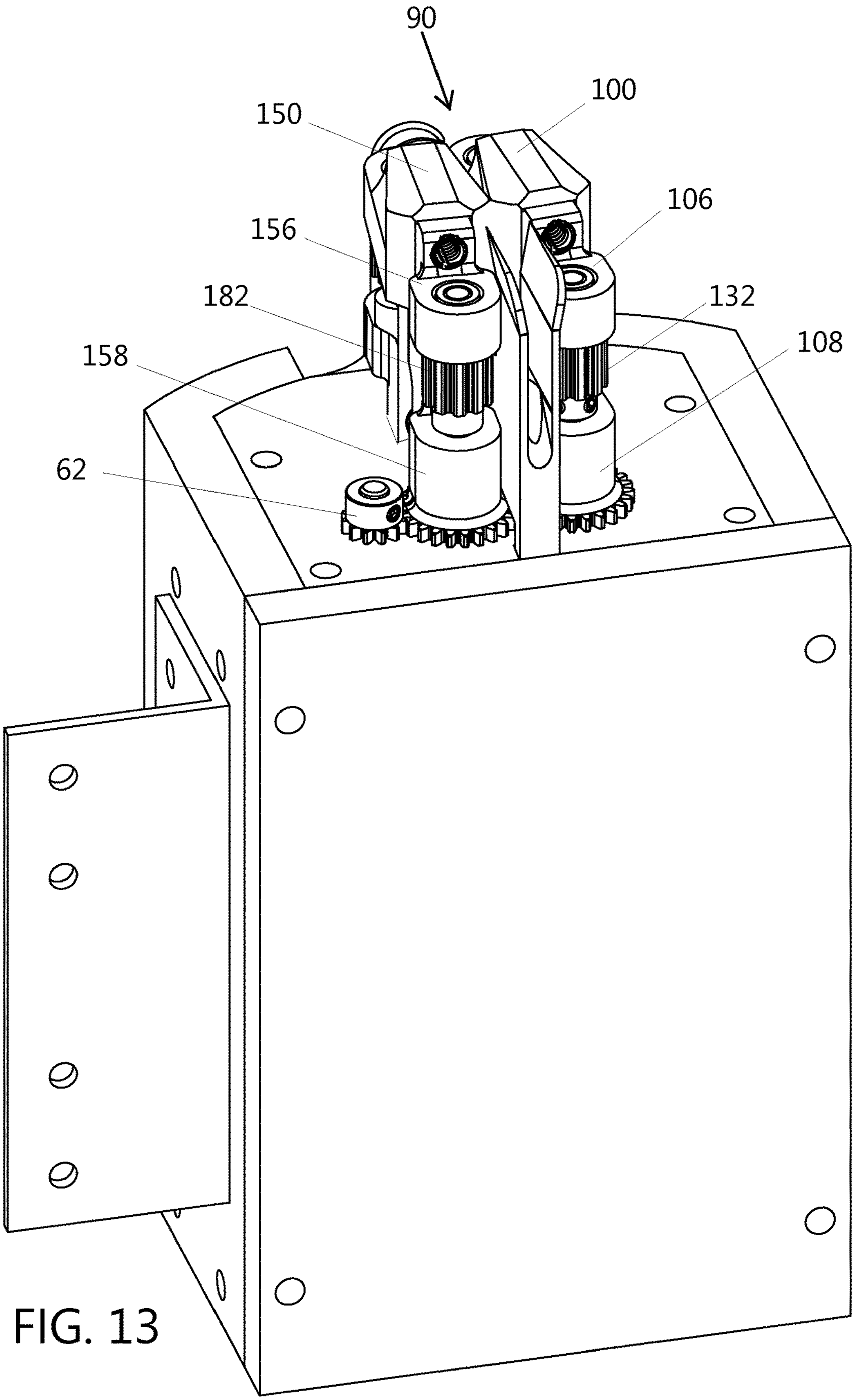
FIG. 13 is a back perspective view of an embodiment of the strand feeder assembly of the present invention shown in the closed position.
Figure 14:
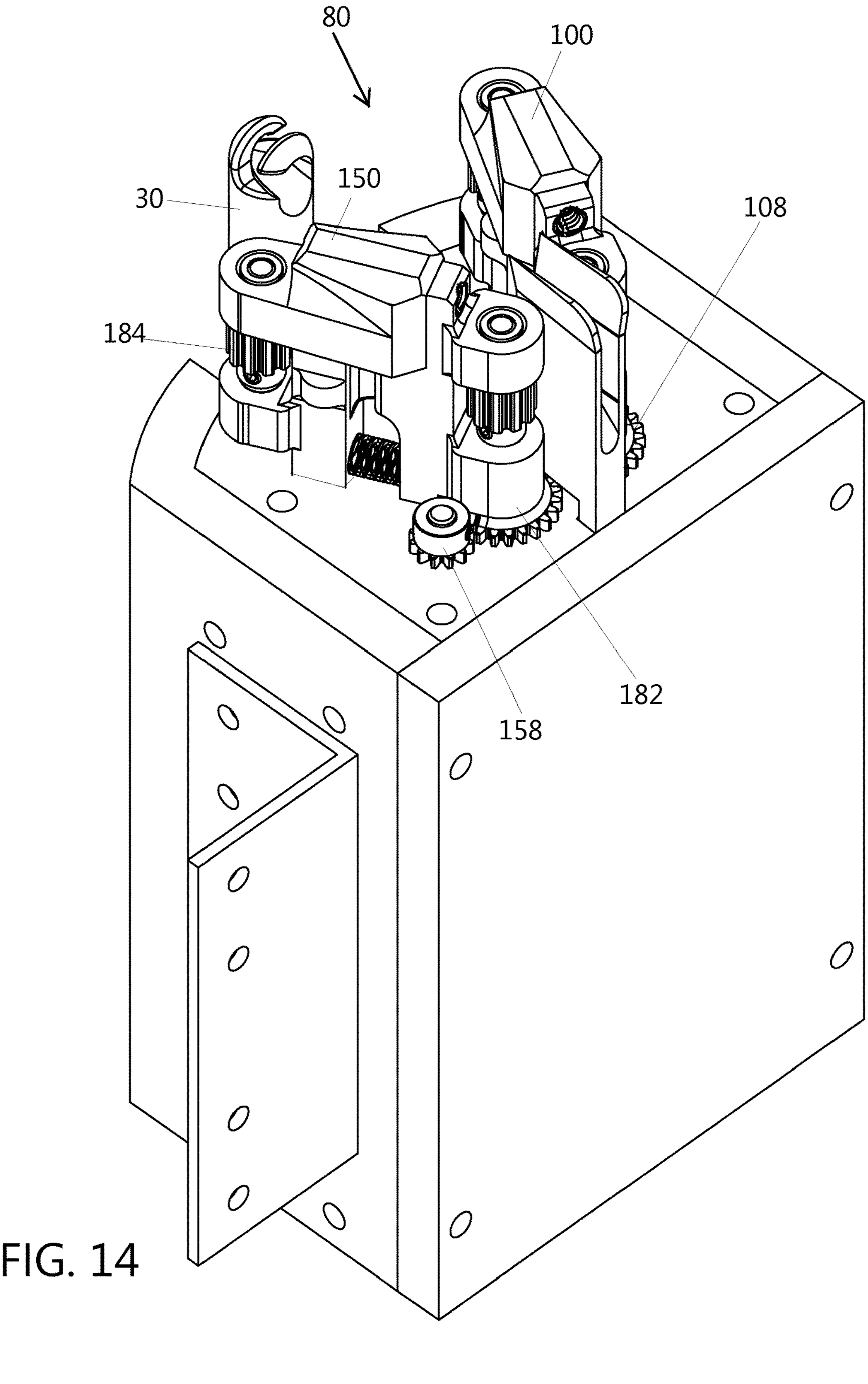
FIG. 14 is a back perspective view of the strand feeder assembly of the type shown in FIG. 13, shown in the open position.
Figure 15:
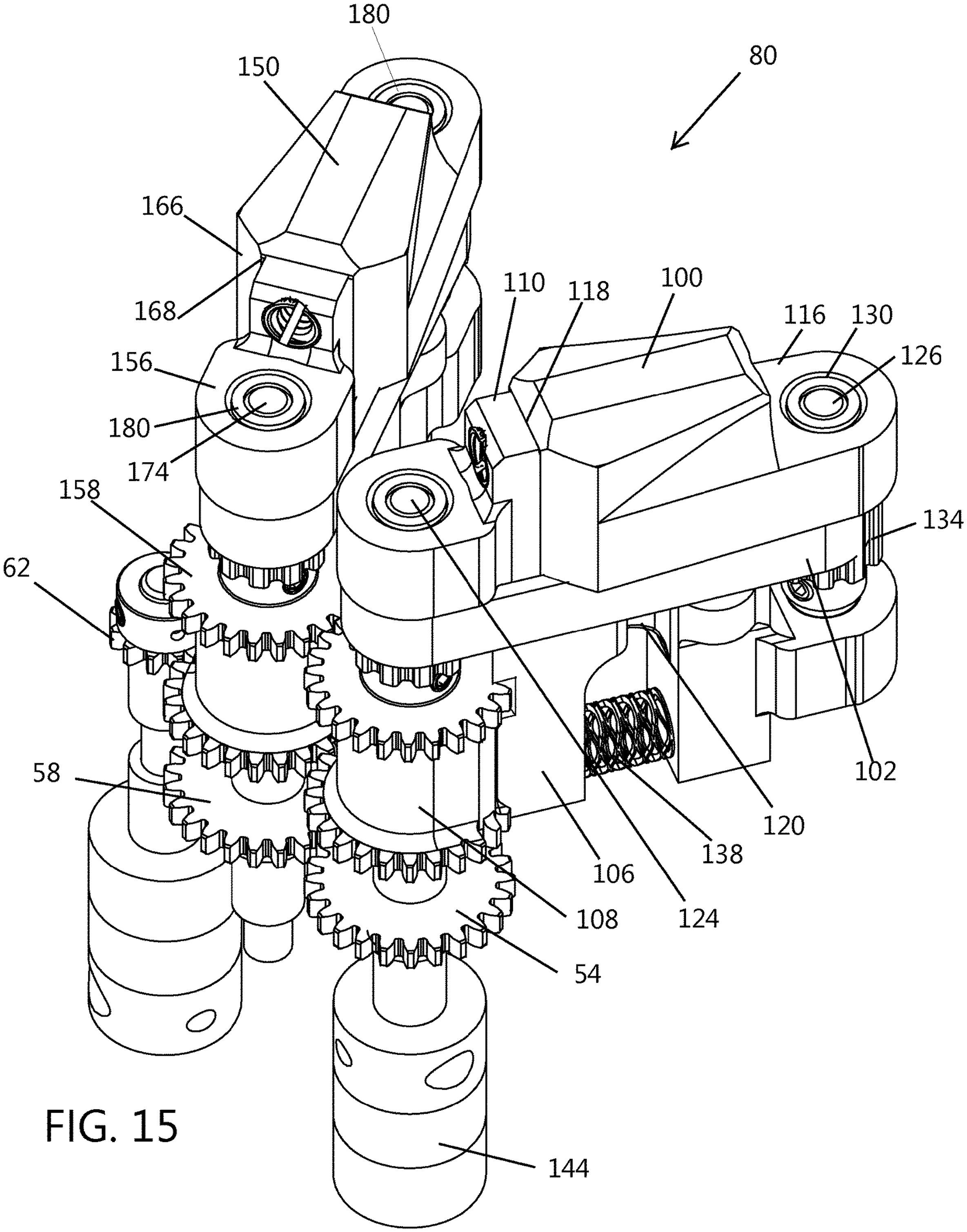
FIG. 15 is a back top perspective view of a wire advancement assembly of the present invention shown in an open position.
Figure 16:
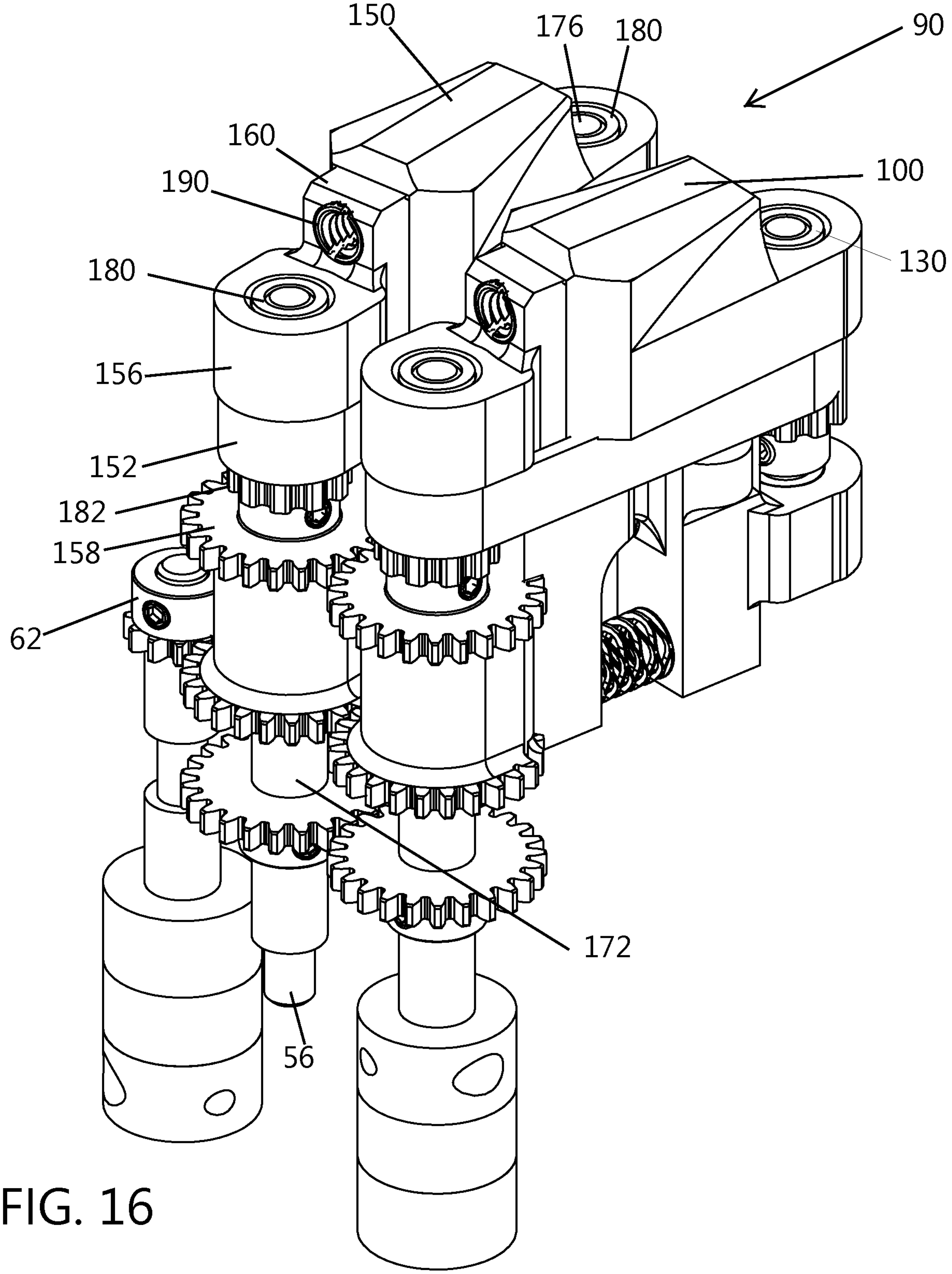
FIG. 16 is a back top perspective view of a wire advancement assembly of the present invention shown in a partially closed position.
Figure 17:
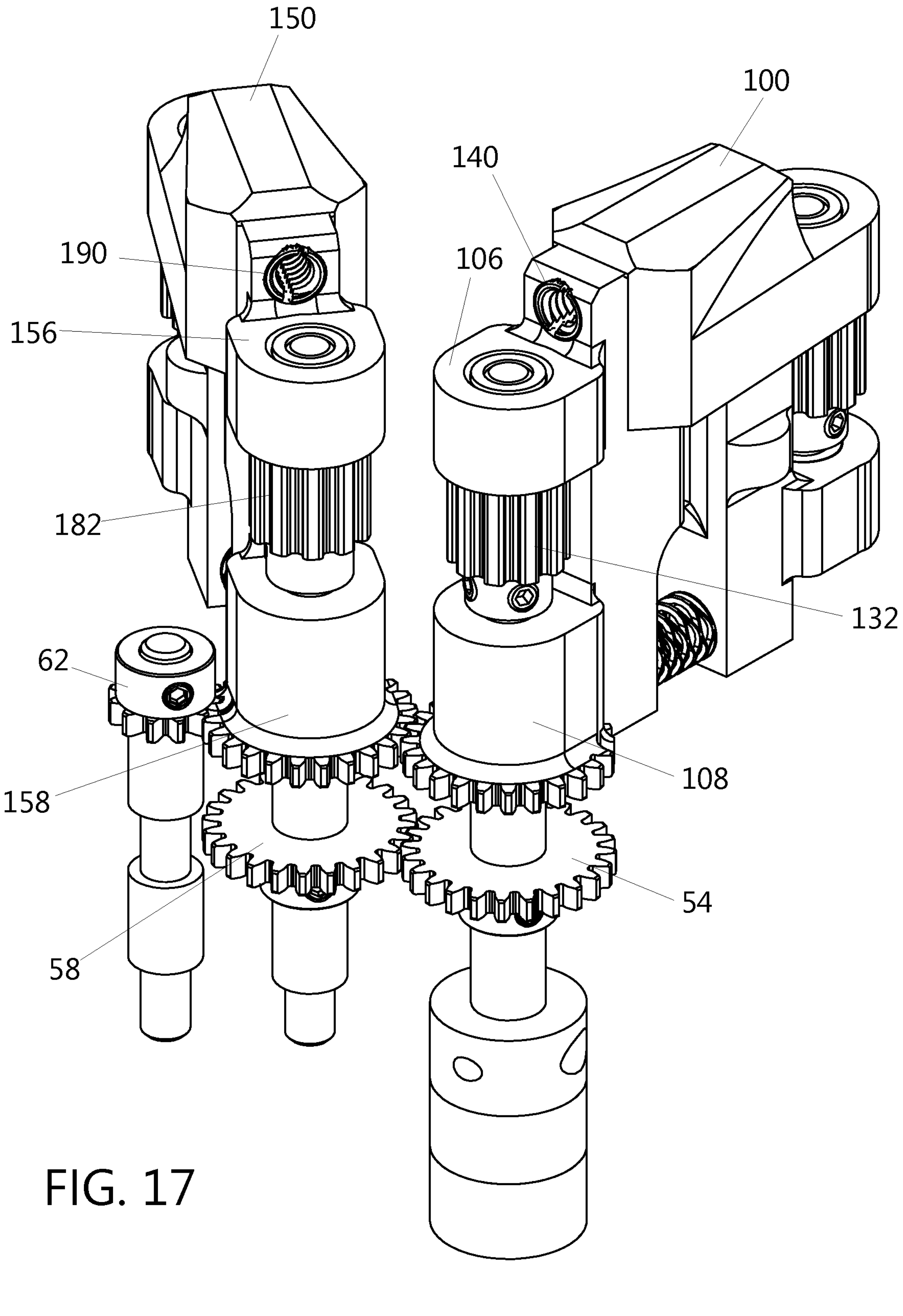
FIG. 17 is a partial sectional back top perspective view of a wire advancement assembly of the present invention shown in an open position.
Figure 18:
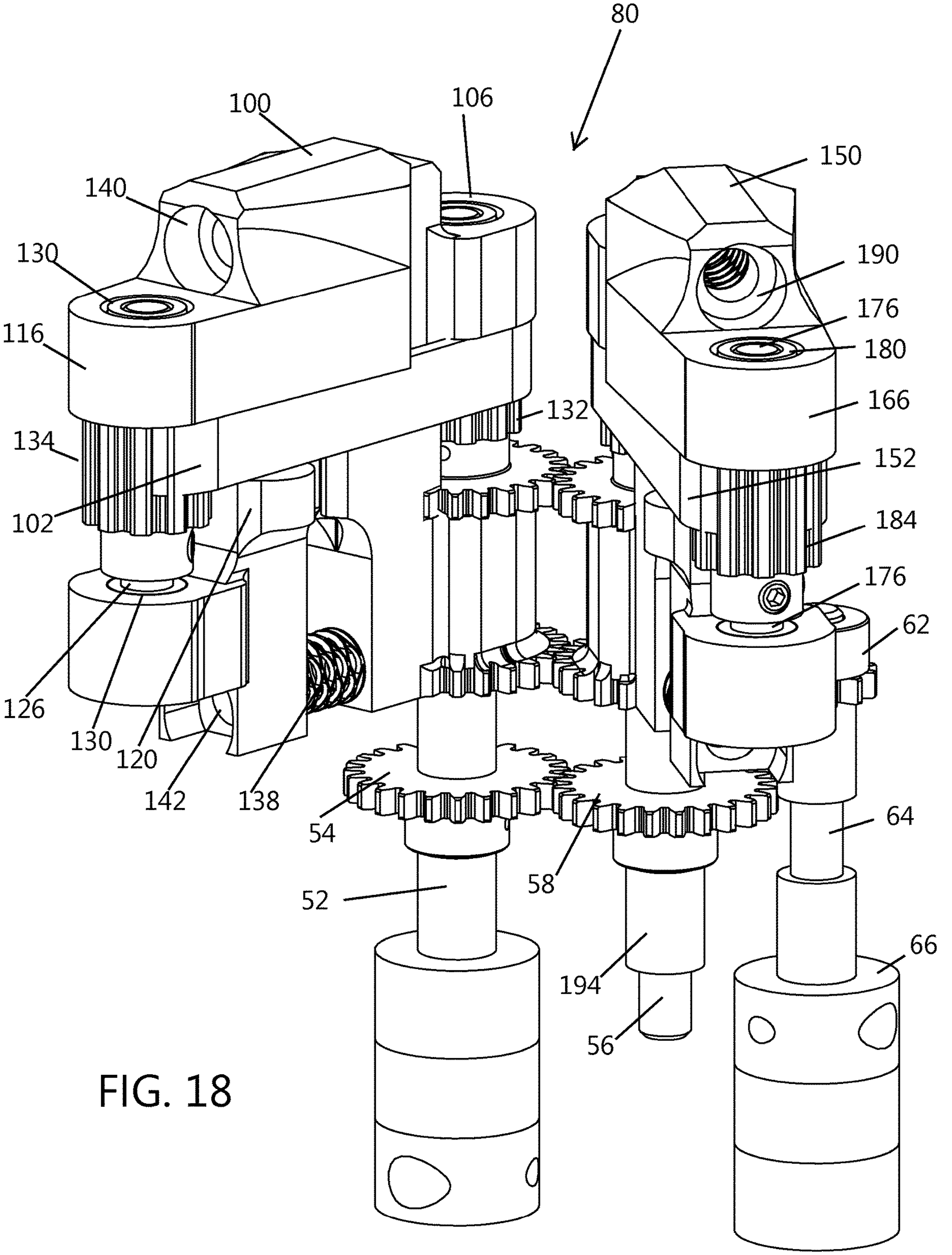
FIG. 18 is a partial sectional front perspective view of a wire advancement assembly of the present invention shown in an open position.
Figure 19:
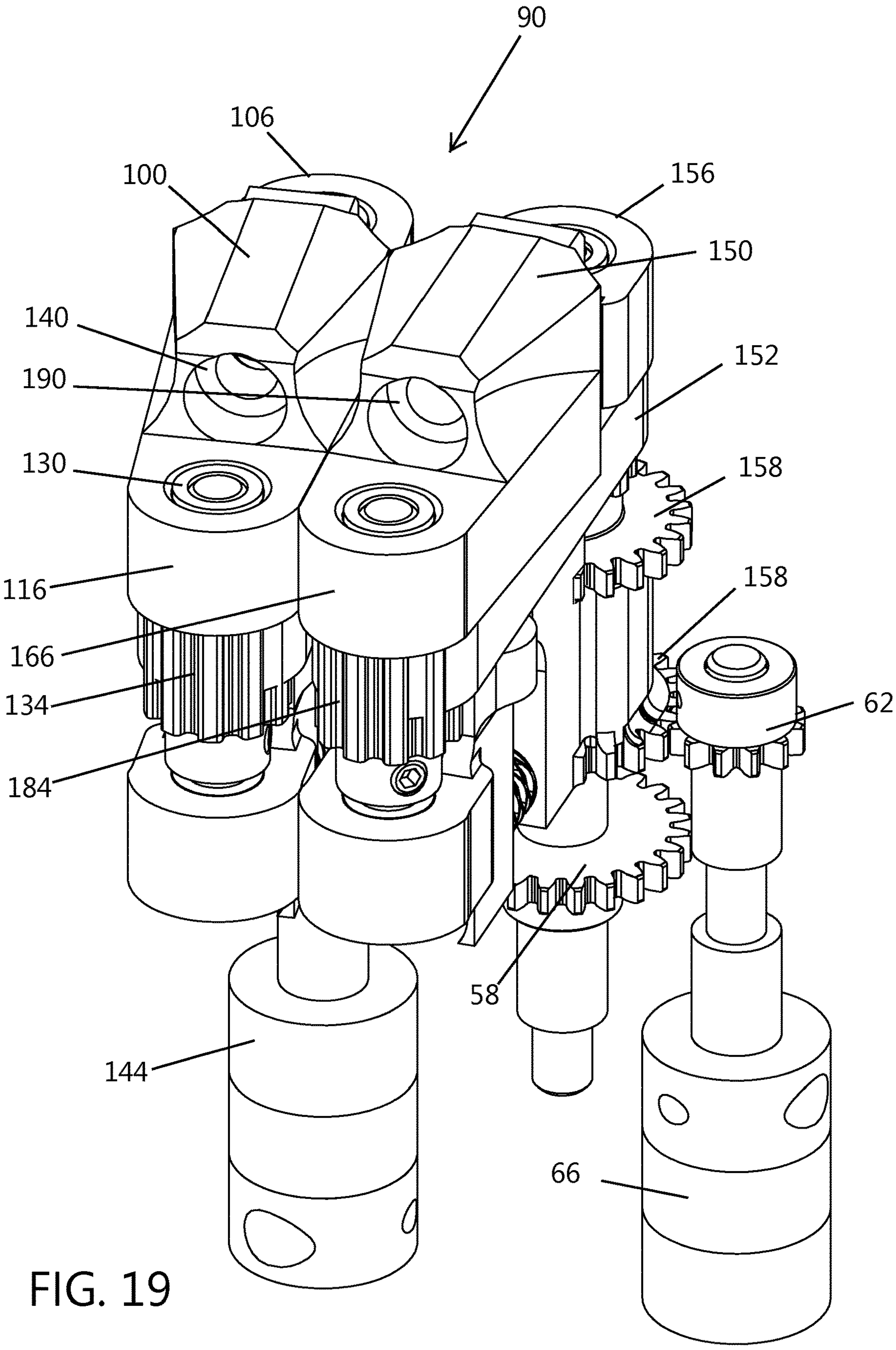
FIG. 19 is a partial sectional front perspective view of a wire advancement assembly of the present invention shown in a closed position.
Figure 20:
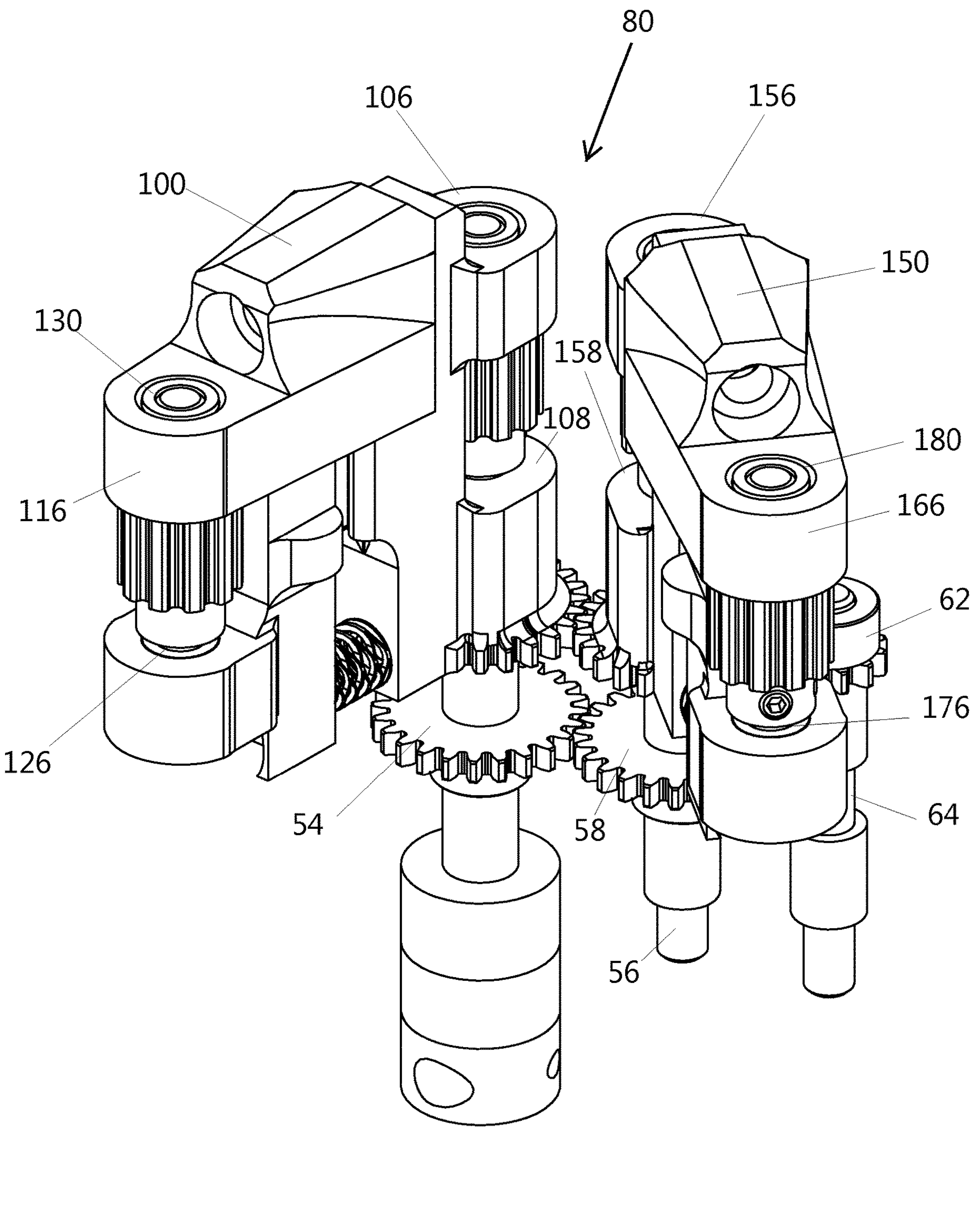
FIG. 20 is a partial sectional front perspective view of a wire advancement assembly of the present invention shown in an open position.
Figure 21:
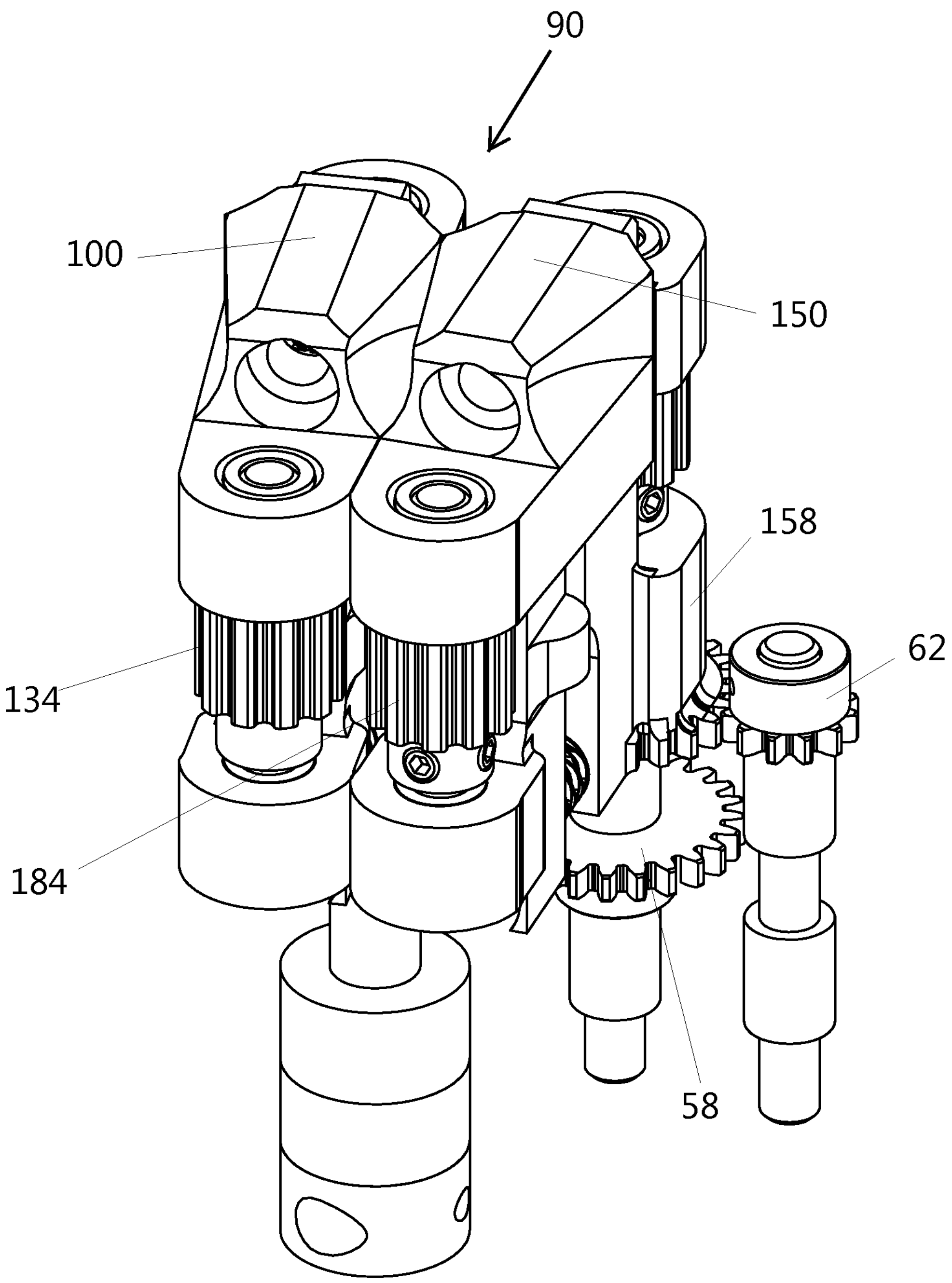
FIG. 21 is a partial sectional front perspective view of a wire advancement assembly of the present invention of the type shown in FIG. 20, shown in the closed position.
Figure 22:
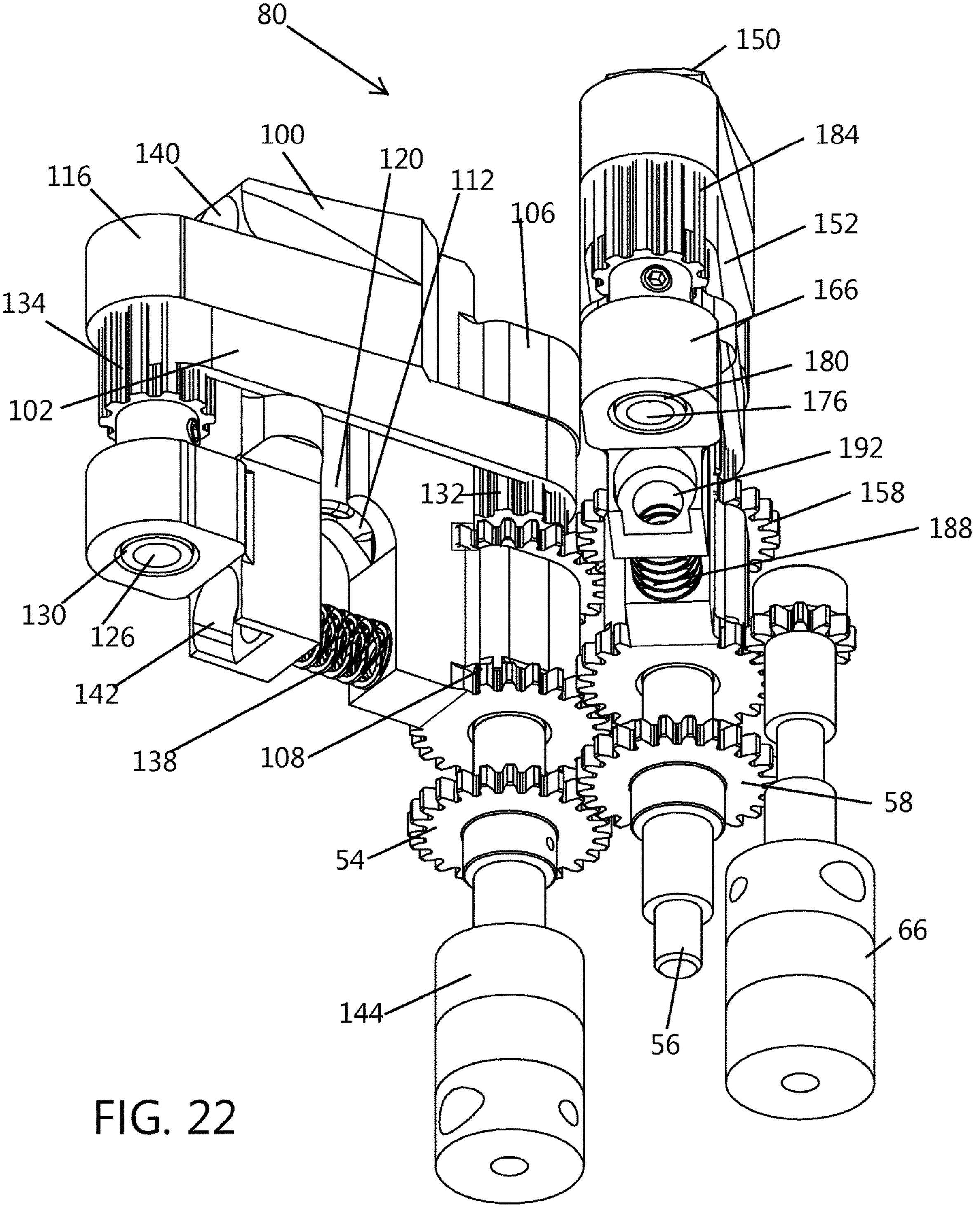
FIG. 22 is a partial sectional front lower perspective view of a wire advancement assembly of the present invention shown in an open position.
Figure 23:
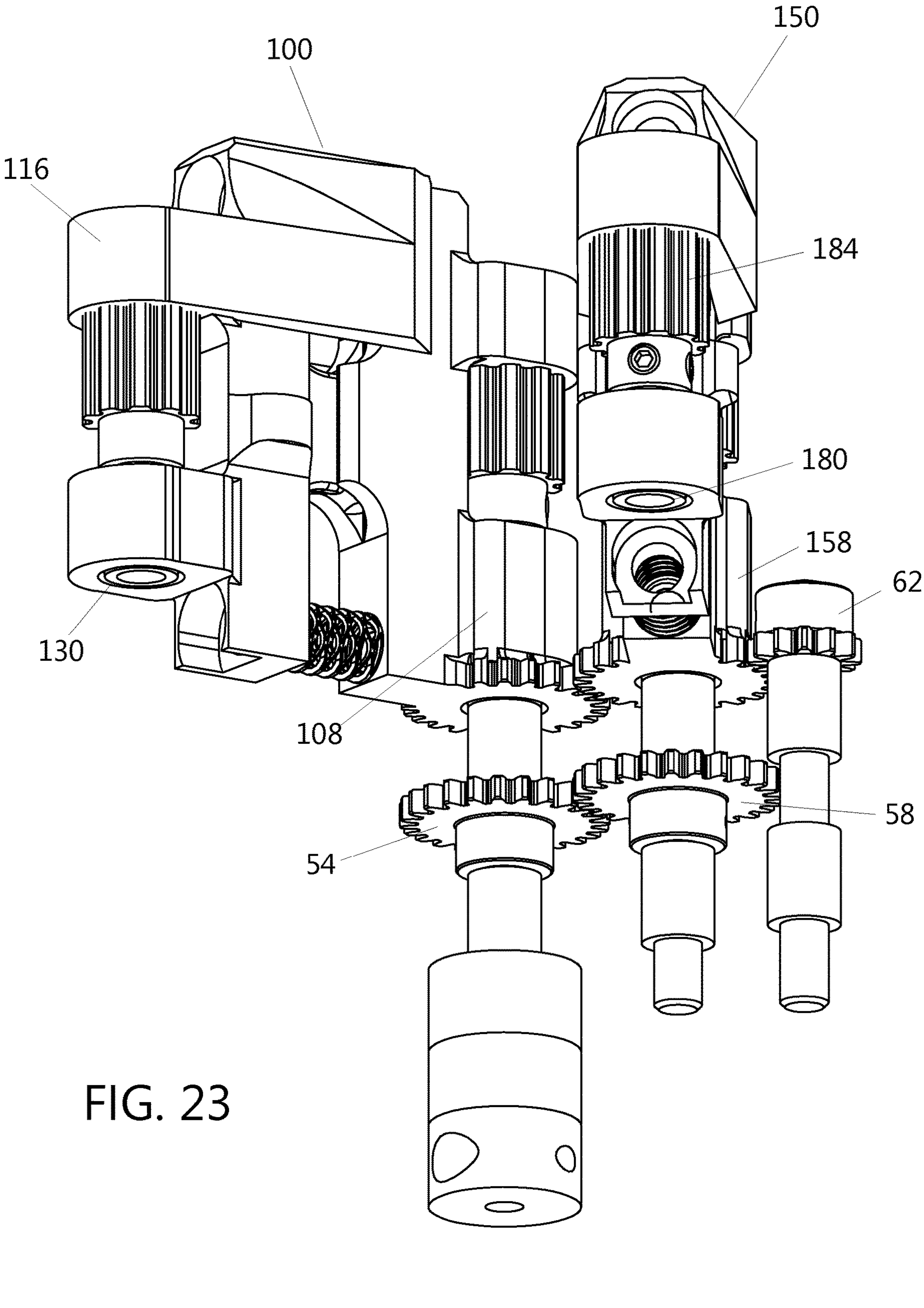
FIG. 23 is a partial sectional front lower perspective view of another embodiment of the wire advancement assembly of the present invention shown in the open position.
Figure 24:
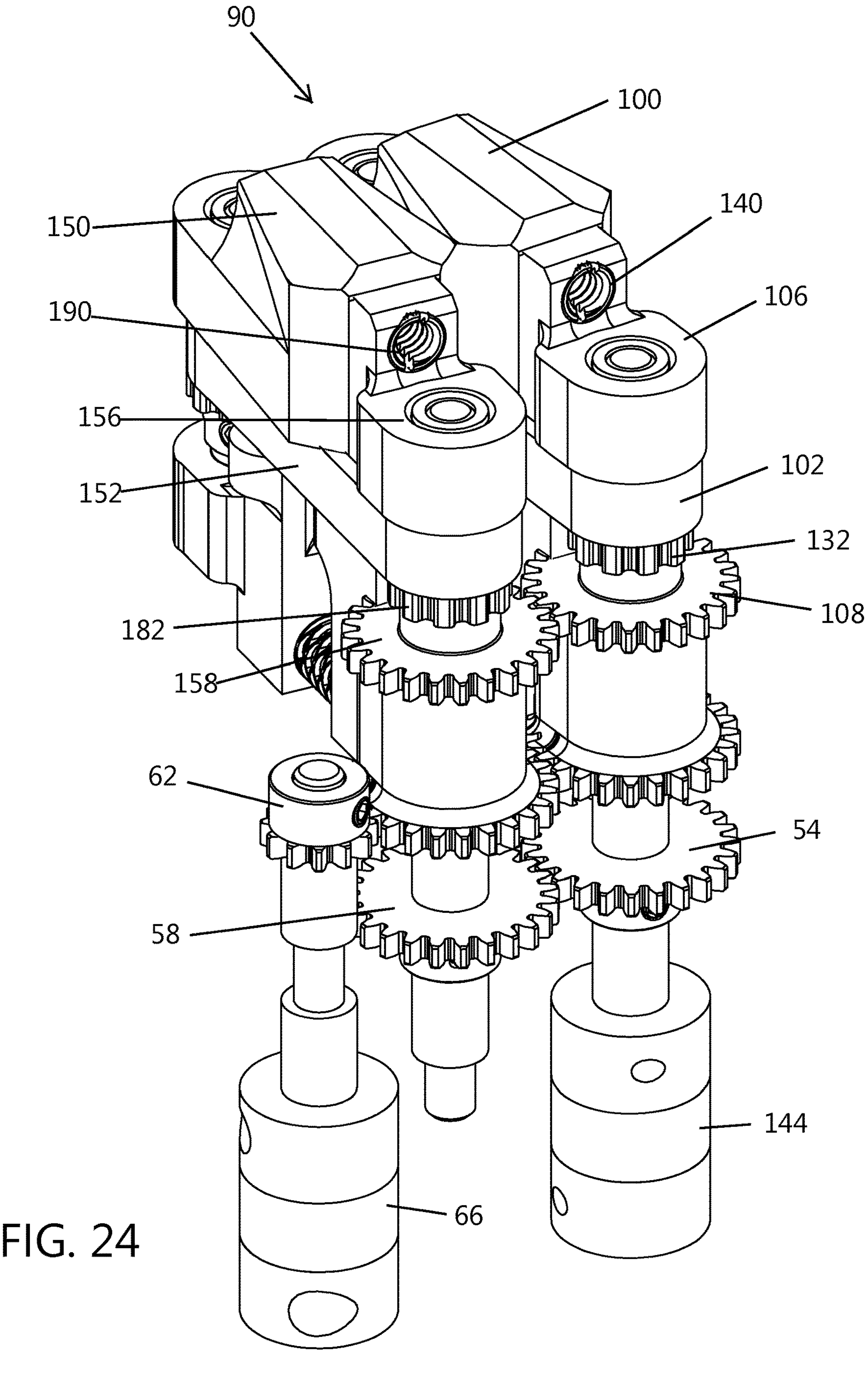
FIG. 24 is a partial sectional back perspective view of a wire advancement assembly of the present invention shown in a closed position.
Figure 25:
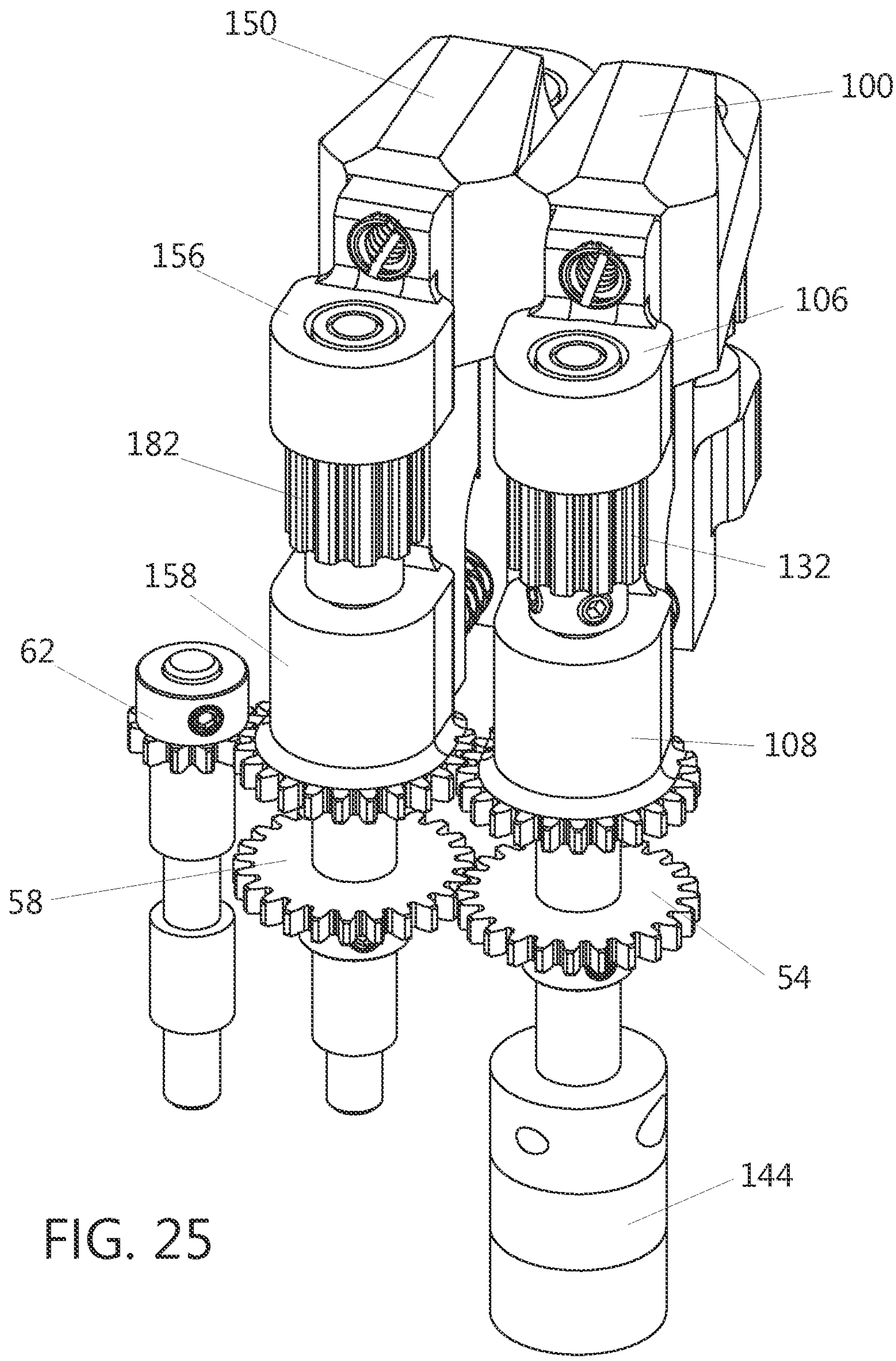
FIG. 25 is a partial sectional back perspective view of an alternate embodiment of the wire advancement assembly of the present invention shown in a closed position.

The following description provides detail of various embodiments of the invention, one or more examples of which are set forth below. Each of these embodiments are provided by way of explanation of the invention, and are not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Embodiments of the wire feeder apparatus of the present invention are particularly well suited for repetitively receiving a wire from a gripper of an automated processing tool and then load that same wire into a conduit coupled to the gripper of the automated tool without denting or damaging the wire. The wire feeder assembly 10 of the present invention generally includes a wire feeder 14 having belts that are supported to both pivot and rotate, a wire guide 20, a drive or belt rotation motor 50, and an actuator or belt pivot motor 60. The belts of the wire feeder rotate in opposing directions to advance a wire through the wire feeder. The wire feeder is further capable of handling many different wire gauges and is able to pick and place the wire without denting the exterior casing of the wires.

With reference to Figures, embodiments according to aspects of the invention will be described in conjunction with operation of the wire feeder 14 of the wire feeder assembly 10. FIGS. 1-6 illustrates the wire feeder assembly 10 from various views and with components removed to show the certain components of the wire feeder assembly 10. The wire feeder assembly 10 may generally include a wire feeder 14, wire guide inlet 20, wire guide outlet 30, a base or frame 40, a drive motor 50, a pivot motor 60 and controller 70. The first wire guide or inlet 20 includes angling sides 24 and a bottom trough 22. The angling sides 24 and trough 22, together, tend to funnel a wire from a robotic gripper 200 to the opposing belt assemblies 100 and 150. Further, as the wire feeder 14 advances a wire, the angling sides 24 keep the wire in alignment with a longitudinal axis of the belt assemblies. In this manner, the wire tends to feed through the wire feeder 14 without undesirable whipping and perturbations. A second wire guide 30 may be positioned at an outlet of the wire feeder 14. The second wire guide may include a modified eyelet or a simple u-shape to further stabilize the wire as it feeds through the wire feeder 14.

As best seen in the partial sectional views, the base 40 includes internal base plates onto which the drive motor 50 and pivot motor 60 are mounted. Further, an external mounting plate 46 is provided that may be utilized to stabilize the wire feeder assembly 10 within a processing tool or within a work space of a robotic arm. The base 40 includes venting 44 to allow heat from motors 50 and 60 to dissipate from the base. The drive motor 50 includes a first drive shaft 52 that extends from and that is powered or rotated by the motor. A first drive gear 54 is fixed to the drive shaft 52 such that rotation of the drive shaft rotates the gear 54. Drive shaft 52 may include coupling 144 to allow removal of the motor 50 without disassembling the wire feeder assembly 10. The shaft 52 extends through base plates 42 and out of base 40. Bearings may be utilized to mount the shaft to the base plates and to provide rotational stability to the shaft. A second drive shaft 56 is mounted to the base plates 42 with bearings. The second drive shaft includes a second gear 58 fixed to the shaft. The second drive shaft is oriented so that the second gear 58 engages with first gear 54. A rotation of the first drive shaft 52 thus also rotates the second shaft 56.

Further, the pivot motor or actuator 60 is mounted to base plates 42. The actuator 60 includes a shaft 64 that extends through the base plates and out of the base 40. Bearings may be utilized to mount the shaft to the base plates and to provide rotational stability to the shaft. A pivot gear 62 is external to the base 40 and is coupled to the actuator shaft 64 via a coupling 66. The pivot gear 62 engages gearing of the wire feeder 14 such that rotation of the actuator shaft 64 pivots the belt assemblies 100 and 150 between an open position 80 and closed position 90. FIGS. 7-14 further illustrate the wire feeder 14 of the wire feeder assembly 10 actuated between the open position 80 and the closed position 90. Controller 70 incudes circuitry to control the speed and direction of rotation of the drive motor 50 and actuator motor 60. The controller 70 may further receive input from a processing tool such that the control of motors 50 and 60 may be linked to the motion of the processing tool. In this manner, the timing and direction of rotation of the belt assemblies 100 and 150 may be controlled to thereby advance a wire through the feeder 14 at the appropriate time.

Referring to FIGS. 15-25, components of the wire feeder 14 will now be described in greater detail. The wire feeder 14 includes a first belt assembly 100 and second belt assembly 150. The first belt assembly 100 generally includes a belt 102, a pivot clevis 106, a tension clevis 116, a belt drive shaft 124 and belt idler shaft 126. The pivot clevis includes an upper protrusion 110 that mates with an upper receptacle 118 formed in the tension clevis 116. The pivot clevis 106 further includes a lower receptacle 112 that receives in mating relation a lower protrusion 120 extending from the tension clevis 116. Tension springs 138 are positioned between and separate the pivot clevis 106 and the tension clevis 116. Bolts (not shown) are positioned within the pivot clevis tension adjuster 140 and the tension clevis tension adjuster 142 to fasten together the tension clevis and pivot clevis. The spring 138 tends to push the pivot clevis 106 and tension clevis 116 apart while the bolts may be turned to draw the clevis together. A belt drive shaft 124 extends through the pivot clevis and a belt idler shaft extends through the tension clevis. Both shafts are fixed in place and rotatable within bearings 130. A belt drive gear 132 is fixed to the belt drive shaft 124 and a belt idler gear 134 is fixed to the idler shaft 126. When belt 102 surrounds or encompasses the belt drive gear 132, belt drive shaft 124, pivot clevis 106, belt idler gear 134, belt idler shaft 126, and tension clevis 116, the amount of tension applied to the belt may be adjusted by tightening or loosening the bolts within the tension adjusters 140 and 142. Further, the height position of the belt on gears 132 and 134 may be adjusted by tightening or loosening the bolts within the tension adjusters 140 and 142.

Similarly, the second belt assembly 150 generally includes a belt 152, a pivot clevis 156, a tension clevis 166, a belt drive shaft 174 and belt idler shaft 176. The pivot clevis includes an upper protrusion 160 that mates with an upper receptacle 168 formed in the tension clevis 166. The pivot clevis 156 further includes a lower receptacle that receives in mating relation a lower protrusion extending from the tension clevis 166. Tension springs 188 are positioned between and separate the pivot clevis 156 and the tension clevis 166. Bolts (not shown) are positioned within the pivot clevis tension adjuster 190 and the tension clevis tension adjuster 192 to fasten together the tension clevis and pivot clevis. The spring 188 tends to push the pivot clevis 156 and tension clevis 166 apart while the bolts may be turned to draw the clevis together. A belt drive shaft 174 extends through the pivot clevis and a belt idler shaft extends through the tension clevis. Both shafts are fixed in place and rotatable within bearings 180. A belt drive gear is fixed to the belt drive shaft 174 and a belt idler gear 184 is fixed to the idler shaft 176. When belt 152 surrounds or encompasses the belt drive gear 182, belt drive shaft 174, pivot clevis 156, belt idler gear 184, belt idler shaft 176, and tension clevis 166 the amount of tension applied to the belt may be adjusted by tightening or loosening the bolts within the tension adjusters 190 and 192. Further, the height position of the belt on gears 182 and 184 may be adjusted by tightening or loosening the bolts within the tension adjusters 190 and 192.

Spindle gear or pivot gear 108 may be fixed to or made integral with the pivot clevis 106. The pivot gear is secured or coupled to drive shaft 124 with a bearing such that the pivot gear 108 freely rotates about drive shaft 124. Likewise, spindle gear or pivot gear 158 may be fixed to or made integral with the pivot clevis 156. The pivot gear is secured or coupled to drive shaft 174 with a bearing such that the pivot gear 158 freely rotates about drive shaft 174. In certain embodiments pivot gears 108 and 158 may have a spool configuration wherein opposing sprockets are formed on opposing ends of the spool. First spool gear 108 freely rotates about the first drive shaft 124. Second spool gear 158 freely rotates about a second drive shaft 174, wherein the first and second spool gear 108 and 158 engage together and the second spool gear is coupled with the actuator via a pivot gear 62. Each spool gear 108 and 158 is fixed to corresponding pivot clevis 106 and 156 of the pivot clevis and tension clevis pair. Alternatively, pivot gears 108 and 158 may include a single sprocket formed on the end to the gear (see, for example, FIGS. 7, 13, 14, 17, 20, 21, 23, and 25). The sprockets of the pivot gears 108 and 158 are aligned and engage together. Pivot gear 62 is fixed in relation to actuator shaft 64 and engages pivot gear 158. Actuation of gear 62 thereby rotates pivot gears 108 and 158 about their respective drive shafts. In this manner the actuator motor may be controlled to pivot the belt assembly 100 about drive shaft 124 and pivot the belt assembly 150 about drive shaft 174.

In use, the wire feeder assembly 10 is particularly well suited for use with a robot gripper 200. A wire dispenser 230 is mounted to the robotic coupling 212 via a support. The wire dispenser includes a sheath or filament conduit (a portion of which is illustrated). The wire feeder assembly 10 may be controlled to feed entire length of filament or wire 260 into the wire dispenser 230 prior to laying down the wire on a peg board. The sheath is of suitable construction and known to those skilled in the art as a Bowden tube. The robot gripper 200 includes actuating grippers 204 and 208 that actuate between an open position 220 and a closed position 222. When in a closed position 222, a central axis of a horizontal wire is captured and held in a horizontal orientation within the gripper 200. The wire grips include a leading edge 240 and trailing edge 242. FIGS. 18-22 further illustrates the use of the wire feeder 14 to first receive a wire 260 from the robot gripper 200 and then automatically load the wire 260 into the wire dispenser 230. Details of the robot gripper of the present invention are further described in co-filed and co-pending patent application the details of which are incorporated by reference in its entirety.

Figure 26:
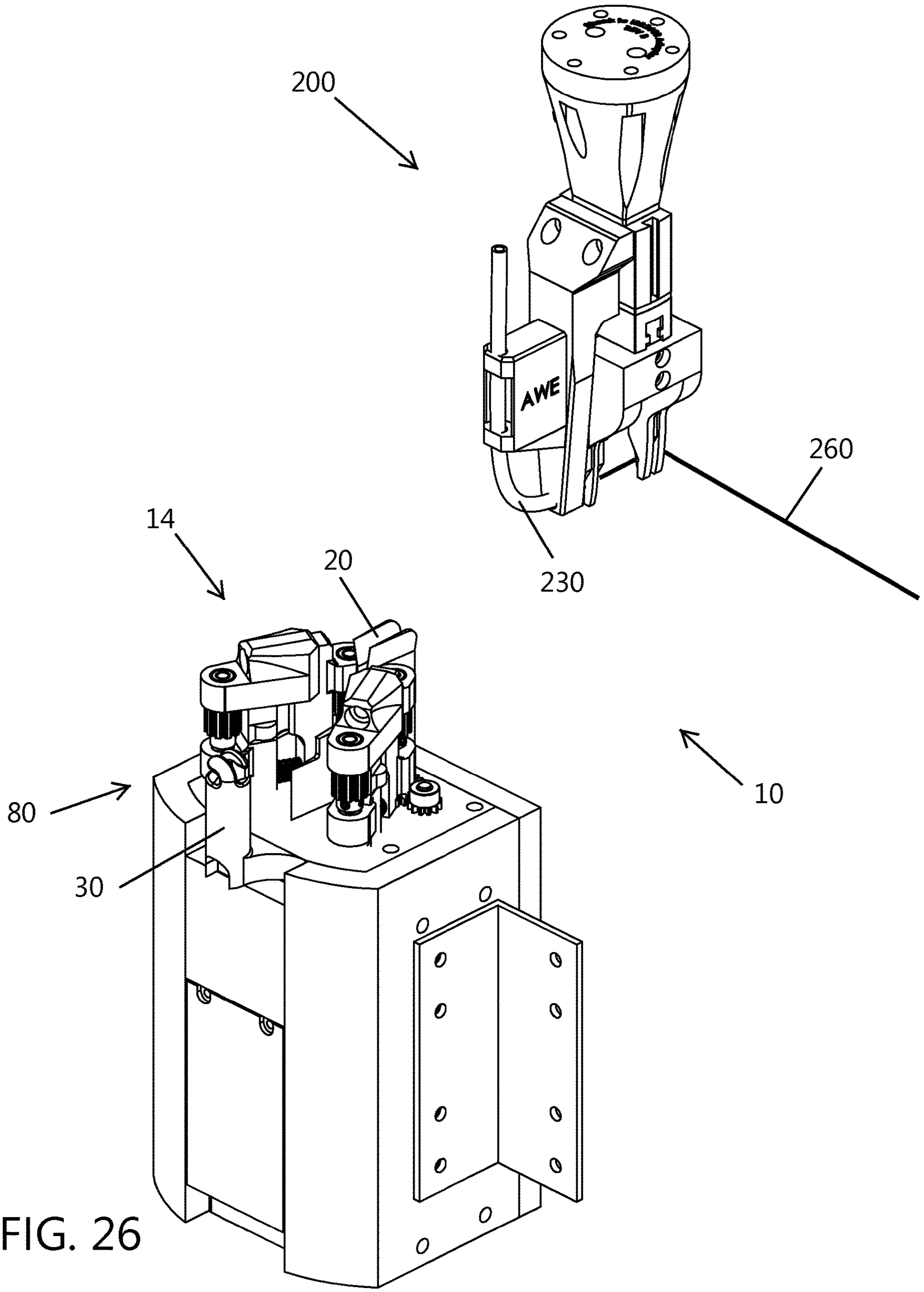
FIG. 26 is a front right perspective view showing a gripper of an automated processing tool aligned with the back of a strand feeder assembly of the present invention.
Figure 27:
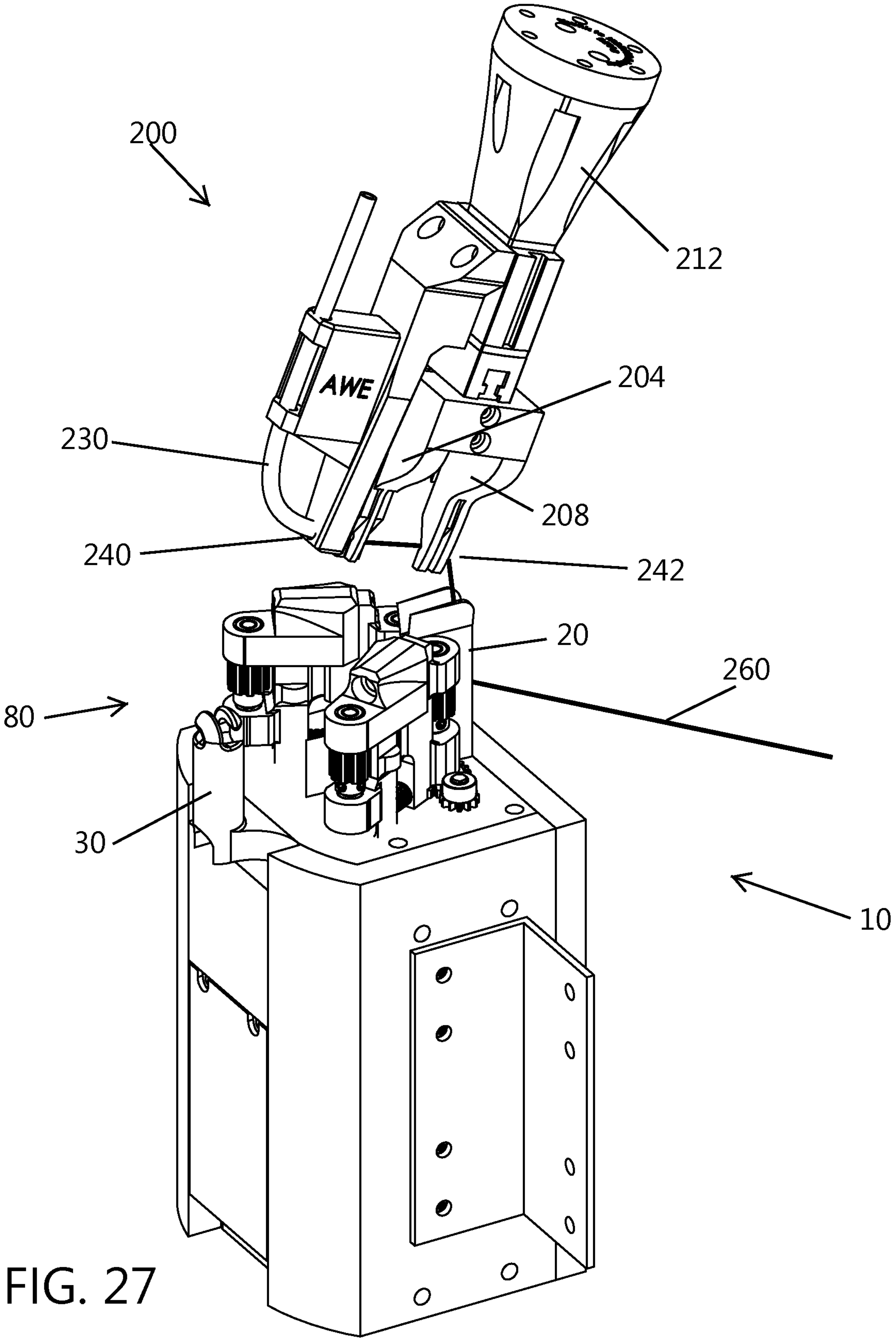
FIG. 27 is a front right perspective view showing a gripper of an automated processing tool aligned and advancing a wire into an input wire guide of a strand feeder assembly of the present invention
Figure 28:
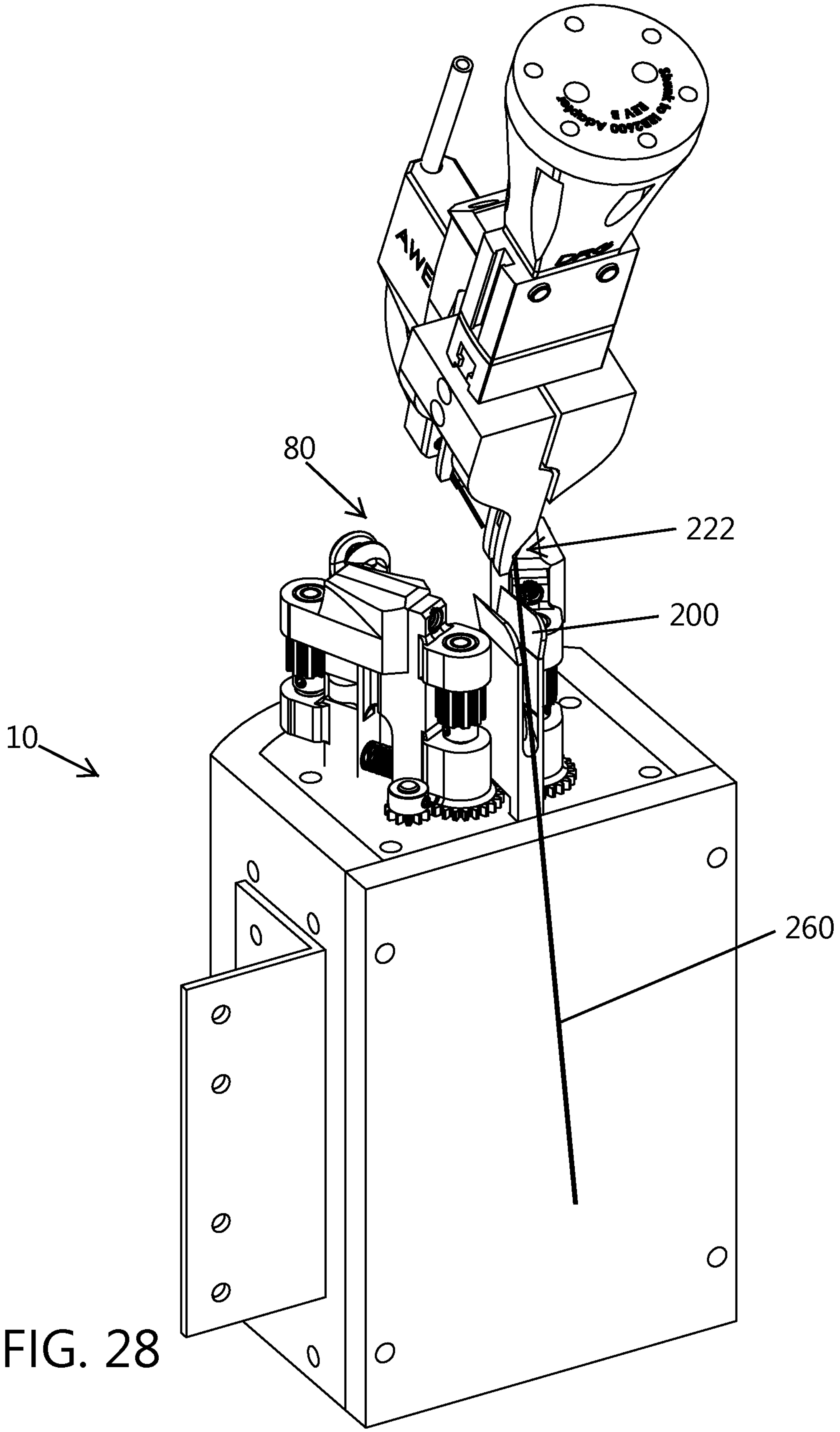
FIG. 28 is a back right perspective view showing a gripper of an automated processing tool aligned and advancing a wire into an input wire guide of a strand feeder assembly of the present invention.
Figure 29:
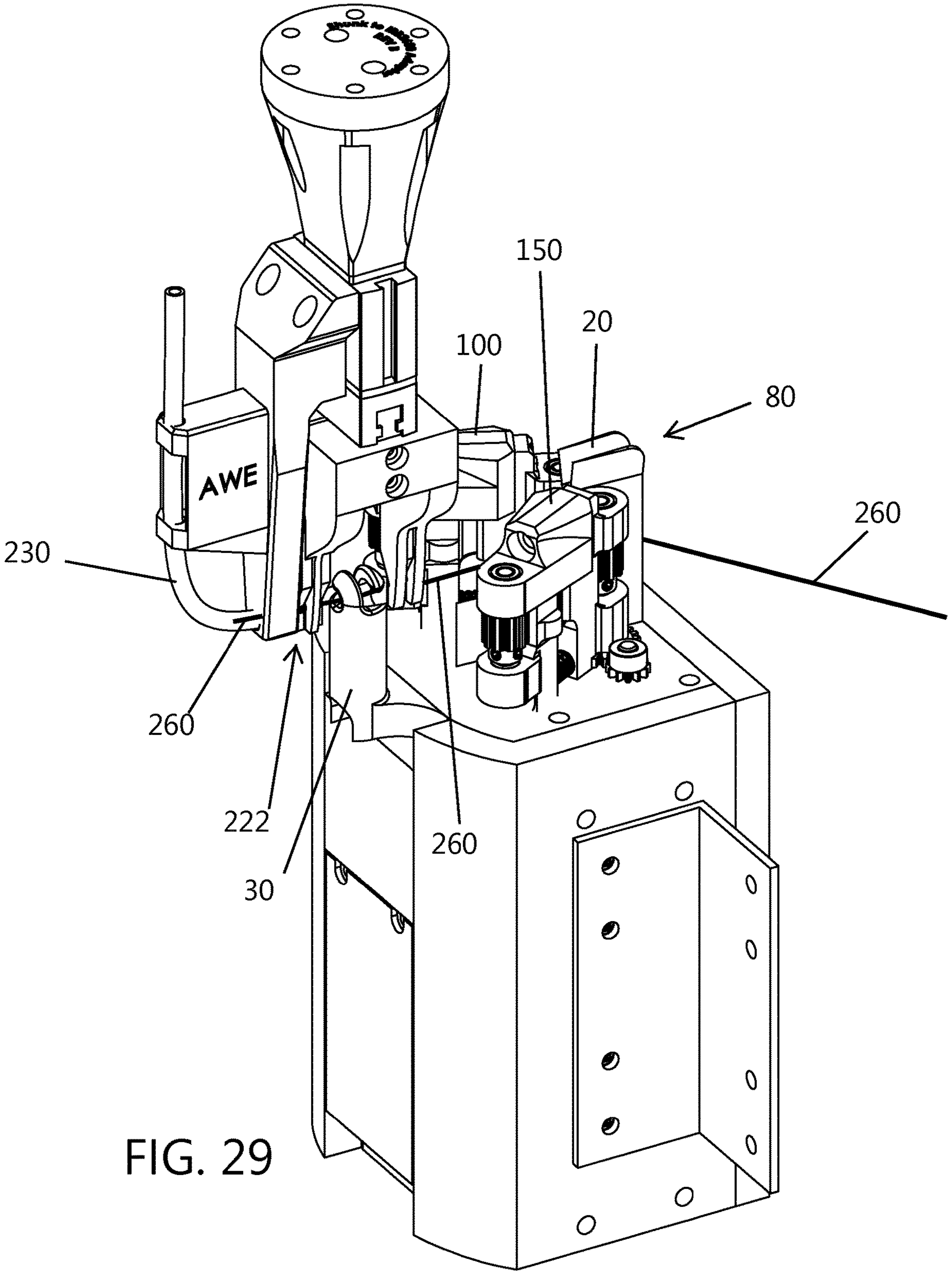
FIG. 29 is a front right perspective view showing a gripper of an automated processing tool aligned with a wire advancement assembly of the present invention and showing the grippers in a closed position and the wire advancement assembly in the open position.
Figure 30:
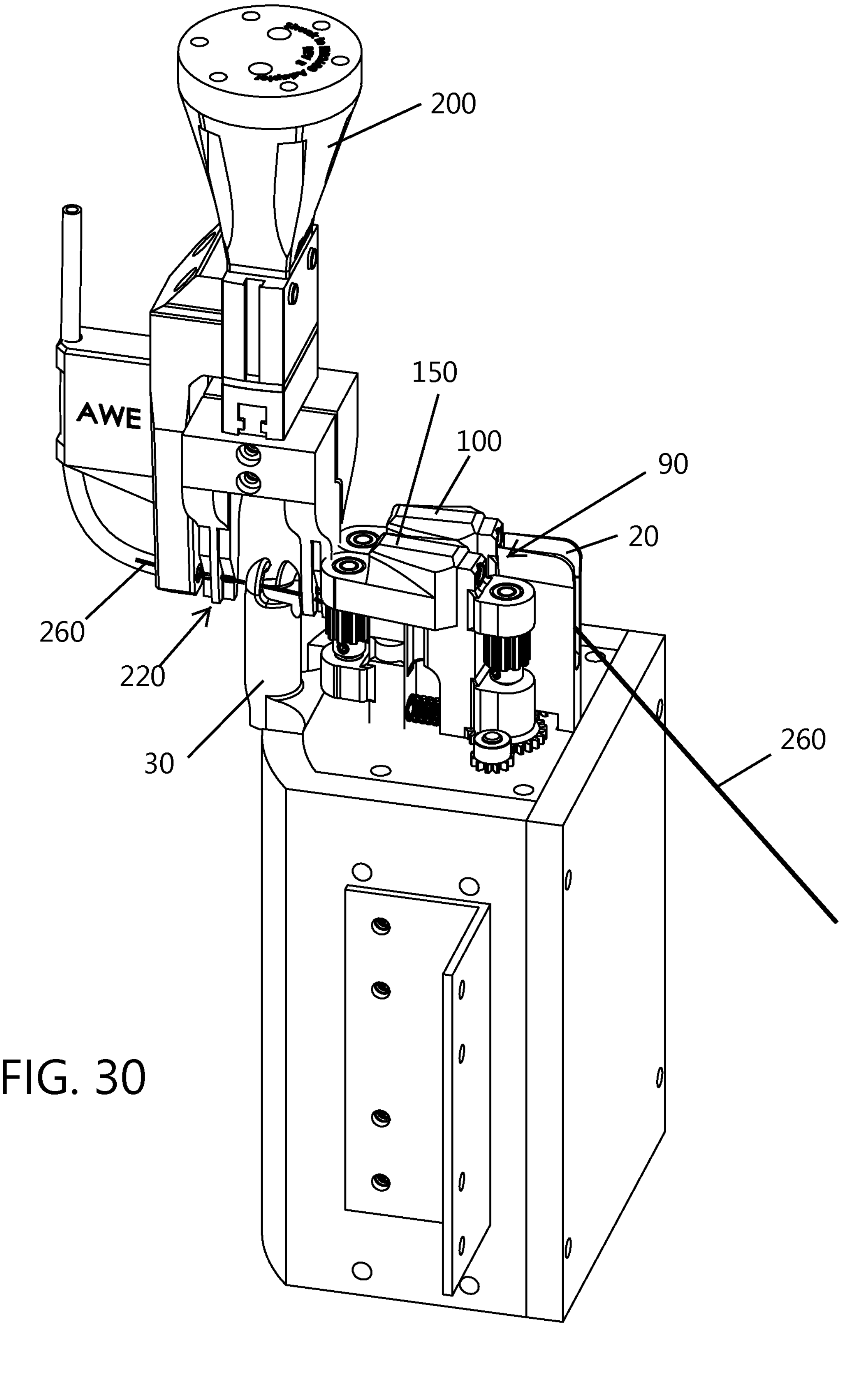
FIG. 30 is a right side perspective view showing a gripper of an automated processing tool aligned with a wire advancement assembly of the present invention and showing the grippers in an open position and the wire advancement assembly in the closed position.

With reference to FIG. 26, the robot gripper 200 grips in a closed position 222 the end of a wire 260 that may be precut to length. A controller of the robot communicates with controller 70 of the wire feeder assembly 10 so that the orientation of the gripper 200 is known. The gripper drags wire 260 into position so that the wire trails from the wire guide 20 and the leading edge 240 is positioned adjacent the wire guide. The wire feeder 14 is oriented to the open position 80 and then the robot arm moves closer while tipping the leading edge upward (see FIG. 27). The position of the robot gripper 200 relative to the position and orientation of the wire feeder assembly may be determined using known techniques including determining and calibrating the starting or origin coordinates for each and then monitoring the change in coordinate position for each. Alternatively, proximity sensors may be utilized to determine location and change of position for each. The robot gripper is moved so that the longitudinal axis of the wire contained in the gripper is aligned with the longitudinal axis of the wire guide 20. The robot gripper 200 continues to drag the wire through the wire guide 20 and through the second wire guide 30 (see FIGS. 28 and 29). Once the robot has loaded the wire feeder 14 with a wire 260 the actuating grips 204 and 208 are actuated to the open position 220 and the belts assemblies 100 and 150 of the wire feeder 14 are pivoted to the closed position 90. The drive motor 50 is then controlled to rotate the belts and advance the wire 260 into the filament conduit or wire dispenser 230 (see FIG. 30). The controller 70 continues to rotate belts 102 and 152 until the wire completely passes through the wire feeder 14. The actuating grips 204 and 208 are then actuated to the closed position 222 and the robot moves to a pegboard to dispense the wire onto the pegboard along a known path.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus to repetitively receive a wire from a gripper of an automated tool and then load the wire into a conduit coupled to the automated tool, said apparatus comprising:

a wire feeder having belts for advancing a wire wherein the belts are supported to both rotate and pivot;

a first wire guide aligned with a longitudinal axis of the rotatable and pivotable belts;

a drive motor having a first drive shaft coupled to the wire feeder to rotate the belts;

an actuator coupled to the wire feeder to pivot the belts;

wherein the first wire guide is further aligned at an inlet of the wire feeder;

a second wire guide aligned with the longitudinal axis of the rotatable and pivotable belts and also aligned at an outlet of the wire feeder; and wherein the second wire guide is spaced apart from the wire feeder a sufficient distance to allow a first grip of the dripper of the automated tool to be positioned between the second wire guide and the wire feeder.

2. The apparatus as recited in claim 1, wherein the wire feeder includes opposing first and second belts.

3. The apparatus as recited in claim 2, wherein the first and second belts pivot in opposing directions.

4. The apparatus as recited in claim 2, wherein each belt encompasses an idler shaft.

5. The apparatus as recited in claim 4, further including a pivot clevis and a tension clevis pair encompassed by each belt.

6. The apparatus as recited in claim 5, further including a first spool gear that freely rotates about the first drive shaft, a second spool gear that freely rotates about a second drive shaft, wherein the first and second spool gear are engaged and the second spool gear is coupled with the actuator, and further wherein each spool gear is fixed to corresponding pivot clevis of the pivot clevis and tension clevis pair.

7. The apparatus as recited in claim 6, wherein the first drive shaft includes a drive gear fixed to the first drive shaft.

8. The apparatus as recited in claim 6, wherein the actuator includes a pivot gear that engages with the second spool gear.

9. The apparatus as recited in claim 5, further including adjustable spans interconnecting each tension clevis and pivot clevis pair.

10. The apparatus as recited in claim 1, further including a controller to independently control activation of the drive motor and actuator.

11. An apparatus to repetitively receive a wire from a gripper of an automated tool and then load the wire into a conduit coupled to the automated tool, said apparatus comprising:

a wire feeder having belts for advancing a wire wherein the belts are supported to both rotate and pivot;

a first wire guide aligned with a longitudinal axis of the rotatable and pivotable belts;

a drive motor having a first drive shaft coupled to the wire feeder to rotate the belts;

an actuator coupled to the wire feeder to pivot the belts;

wherein the wire feeder includes opposing first and second belts;

wherein each belt encompasses an idler shaft; and further including a pivot clevis and a tension clevis pair encompassed by each belt.

12. The apparatus as recited in claim 11, further including a first spool gear that freely rotates about the first drive shaft, a second spool gear that freely rotates about a second drive shaft, wherein the first and second spool gear are engaged and the second spool gear is coupled with the actuator, and further wherein each spool gear is fixed to corresponding pivot clevis of the pivot clevis and tension clevis pair.

13. The apparatus as recited in claim 12, wherein the first drive shaft includes a drive gear fixed to the first drive shaft.

14. The apparatus as recited in claim 12, wherein the actuator includes a pivot gear that engages with the second spool gear.

15. An apparatus to repetitively receive a wire from a gripper of an automated tool and then load the wire into a conduit coupled to the automated tool, said apparatus comprising:

a wire feeder having belts for advancing a wire wherein the belts are supported to both rotate and pivot;

a first wire guide aligned with a longitudinal axis of the rotatable and pivotable belts;

a drive motor having a first drive shaft coupled to the wire feeder to rotate the belts;

an actuator coupled to the wire feeder to pivot the belts;

a second wire guide aligned with the longitudinal axis of the rotatable and pivotable belts and also aligned at an outlet of the wire feeder;

wherein the wire feeder includes opposing first and second belts; and further including a pivot clevis and a tension clevis pair encompassed by each belt.

16. The apparatus as recited in claim 15, wherein each belt encompasses an idler shaft.

17. The apparatus as recited in claim 16, further including a first spool gear that freely rotates about the first drive shaft, a second spool gear that freely rotates about a second drive shaft, wherein the first and second spool gear are engaged and the second spool gear is coupled with the actuator, and further wherein each spool gear is fixed to corresponding pivot clevis of the pivot clevis and tension clevis pair.

18. The apparatus as recited in claim 17, further including adjustable spans interconnecting each tension clevis and pivot clevis pair.

19. The apparatus as recited in claim 17, wherein the first drive shaft includes a drive gear fixed to the first drive shaft.

20. The apparatus as recited in claim 17, wherein the actuator includes a pivot gear that engages with the second spool gear.

* * * * *